US009995654B2

(12) United States Patent
Singh

(10) Patent No.: US 9,995,654 B2
(45) Date of Patent: Jun. 12, 2018

(54) TIRE AND VEHICLE SENSOR-BASED VEHICLE STATE ESTIMATION SYSTEM AND METHOD

(71) Applicant: The Goodyear Tire & Rubber Company, Akron, OH (US)

(72) Inventor: Kanwar Bharat Singh, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 263 days.

(21) Appl. No.: 14/794,035

(22) Filed: Jul. 8, 2015

(65) Prior Publication Data

US 2017/0010184 A1    Jan. 12, 2017

(51) Int. Cl.
*G01L 1/00*   (2006.01)
*G01M 17/02*  (2006.01)
*G01M 17/00*  (2006.01)
*B60C 19/00*  (2006.01)

(52) U.S. Cl.
CPC .......... *G01M 17/022* (2013.01); *B60C 19/00* (2013.01); *G01M 17/00* (2013.01); *B60C 2019/004* (2013.01); *G01M 17/02* (2013.01)

(58) Field of Classification Search
CPC .... G01M 17/022; G01M 17/00; G01M 17/02; B60C 19/00
USPC .......................................................... 702/41
See application file for complete search history.

(56) References Cited

U.S. PATENT DOCUMENTS 4,364,267 A * 12/1982 Love, Jr. .............. G01G 19/025
                                                          73/146
5,267,161 A    11/1993 Kallenbach et al.
6,539,295 B1 *  3/2003 Katzen .................. G01M 17/02
                                                          701/33.6
7,104,438 B2 *  9/2006 Benedict ............. B60C 23/0493
                                                          235/375
7,546,764 B2    6/2009 Morinaga
(Continued)

FOREIGN PATENT DOCUMENTS

EP    1657082 A1    5/2006
EP    1661737 A2    5/2006
(Continued)

OTHER PUBLICATIONS

Eric A. Wan and Rudolph Van Der Merwe, The Unscented Kalman Filter for Nonlinear Estimation, Adaptive Systems for Signal Processing, Communications and Control Symposium 2000, Oct. 1, 2000, 153-158, XP010521629, Oregon Graduate Institute of Science & Technology, Beaverton, Oregon, US.
(Continued)

*Primary Examiner* — Caleb Henry
(74) *Attorney, Agent, or Firm* — Edward T. Kennedy

(57) ABSTRACT

A vehicle state estimation system and method uses an observer model to make cornering stiffness estimates from tire-based sensor data and vehicle-based sensor data throughout transient and non-transient operational maneuvers of a vehicle. A cornering stiffness identifier extracts transient-state cornering stiffness estimates from the cornering stiffness estimates made by the observer model and extracts from the transient-state cornering stiffness estimates an optimal transient-state cornering stiffness estimate having a substantially highest confidence measure for use by a vehicle control system.

14 Claims, 30 Drawing Sheets

(56) References Cited

U.S. PATENT DOCUMENTS

| | | | |
|---|---|---|---|
| 7,552,628 B2 | 6/2009 | Mancosu | |
| 7,681,960 B2* | 3/2010 | Wanke | B60T 8/17555 |
| | | | 303/146 |
| 7,908,918 B2* | 3/2011 | Brusarosco | B60C 23/0493 |
| | | | 73/146.5 |
| 8,090,492 B2* | 1/2012 | Nagai | B60T 8/172 |
| | | | 180/197 |
| 8,316,700 B2 | 11/2012 | Brusarosco et al. | |
| 8,661,885 B1 | 3/2014 | Singh et al. | |
| 8,844,346 B1 | 9/2014 | Singh et al. | |
| 2002/0198655 A1* | 12/2002 | Bevly | B60T 8/172 |
| | | | 701/36 |
| 2003/0058118 A1* | 3/2003 | Wilson | B60C 23/0423 |
| | | | 340/679 |
| 2003/0093208 A1 | 5/2003 | Hessmert et al. | |
| 2005/0097949 A1* | 5/2005 | Hillenmayer | B60C 23/0488 |
| | | | 73/146 |
| 2006/0173603 A1 | 8/2006 | Mohan et al. | |
| 2007/0240502 A1 | 10/2007 | Morinaga et al. | |
| 2008/0281482 A1* | 11/2008 | Huang | B60W 40/11 |
| | | | 701/37 |
| 2009/0055040 A1* | 2/2009 | Nagaya | B60C 23/0408 |
| | | | 701/31.4 |
| 2009/0105900 A1* | 4/2009 | Tan | B60G 17/0162 |
| | | | 701/71 |
| 2009/0271061 A1* | 10/2009 | Wang | G01M 17/06 |
| | | | 701/29.5 |
| 2010/0131229 A1* | 5/2010 | Nardi | B60T 8/172 |
| | | | 702/142 |
| 2010/0198527 A1 | 8/2010 | Gouriet et al. | |
| 2014/0114558 A1* | 4/2014 | Singh | G01G 19/086 |
| | | | 701/124 |
| 2014/0188406 A1* | 7/2014 | Stalnaker | G01M 17/02 |
| | | | 702/34 |
| 2014/0260585 A1 | 9/2014 | Singh | |
| 2014/0320310 A1* | 10/2014 | Steinhardt | G01C 21/165 |
| | | | 340/870.07 |
| 2015/0248132 A1* | 9/2015 | Lee | B62D 15/025 |
| | | | 701/23 |

FOREIGN PATENT DOCUMENTS

| | | |
|---|---|---|
| EP | 1757464 A1 | 2/2007 |
| EP | 2147842 A1 | 1/2010 |
| JP | 2004-067009 | 3/2004 |

OTHER PUBLICATIONS

Qi Cheng, Alessandro Correa-Victorino and Ali Chararj, A new nonlinear observer of sideslip angle with unknown vehicle parameter using the dual unscented Kalman filter, 2012 15th International IEEE Conference on Intelligent Transportation Systems, Sep. 16-19, 2012, 1716-1721, XP032264144, Anchorage, Alaska, US.
EPO search report received by Applicant dated Oct. 31, 2016.

* cited by examiner $$a_y = \overset{*}{v}_y + v_x \overset{*}{\psi} + g \sin(\Phi_b + \Phi)$$

↓ (measured)  ↘ road bank angle  ↘ roll angle of the vehicle

Vehicle side-slip angle estimation using a simple integration method — measured acceleration signals need to be compensated for the gravity components $\beta$ estimation:  Kinematical formula $$\overset{*}{v}_y = a_y - v_x \overset{*}{\psi} - g \sin(\Phi_b + \Phi)$$

FIG-5A

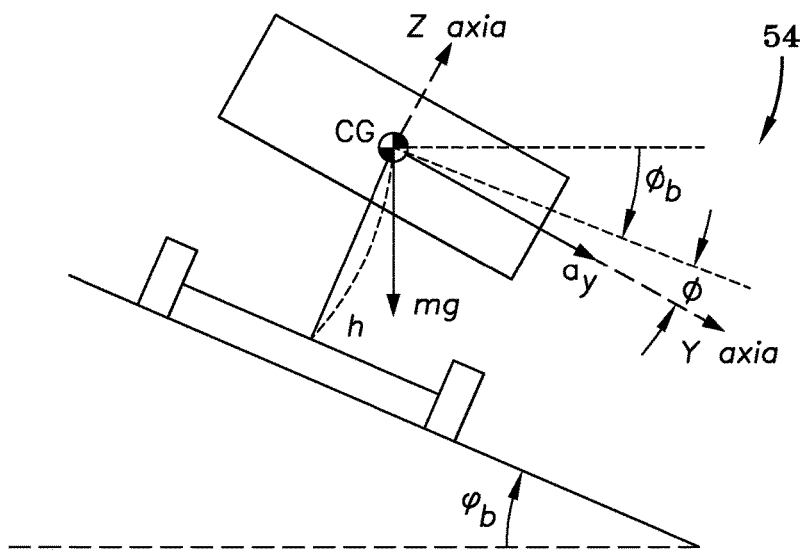

FIG-5B

Tire load information can be used to directly estimate the following vehicle states:

- Vehicle mass (m) – summation of the tire static loads
- CG longitudinal position (a,b) – longitudinal center of gravity (CoG) position can be obtained by measuring the load on the front tires and the rear tires
- Yaw moment of inertia (Izz) – using regression equations that approximate moments of inertia ⟹ all the inertia parameters we need for the two-wheel lateral vehicle dynamics model

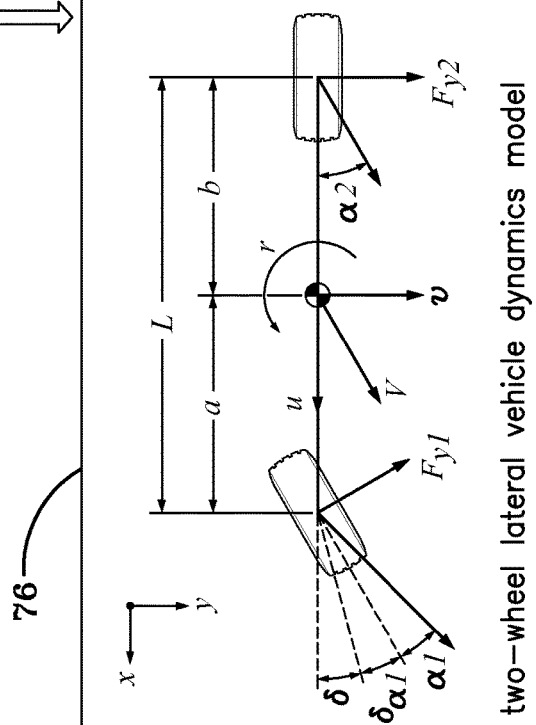

$$ma_y = F_{y1} + F_{y2}$$
$$I_{zz}^* r' = aF_{y1} - bF_{y2}$$

In the above equation $a_y$ is the lateral acceleration and $r'$ is the derivative of the yaw rate. $F_{y1}$ and $F_{y2}$ are the lateral forces acting on the vehicle front and rear axle respectively, $m$ is the vehicle mass and $I_{zz}$ is the yaw moment of inertia of the vehicle. Parameters $a$ and $b$ represent the distance from center of gravity to front and rear axle respectively.

two-wheel lateral vehicle dynamics model

FIG-8

State Equations ($x_k$) — 106

$$f_1 = \beta_{k-1} + \frac{T}{m_v V_x}\left[ C_{\alpha f,k-1}\left(\delta_{f,k-1} - \beta_{k-1} - l_f \frac{\dot{\psi}_{k-1}}{V_x}\right)\cos\delta_{f,k} + F_{xf,k}\sin\delta_{f,k} \right.$$
$$\left. + C_{\alpha r,k-1}\left(\delta_{r,k-1} - \beta_{k-1} + l_r \frac{\dot{\psi}_{k-1}}{V_x}\right)\cos\delta_{r,k} + F_{xr,k}\sin\delta_{r,k} \right] - \dot{\psi}_{k-1}$$

$$f_2 = \dot{\psi}_{k-1} + \frac{T}{I_{zz}}\left[ l_f\left(C_{\alpha f,k-1}\left(\delta_{f,k-1} - \beta_{k-1} - l_f \frac{\dot{\psi}_{k-1}}{V_x}\right)\cos\delta_{f,k} + F_{xf,k}\sin\upsilon_{1,k}\right)\right.$$
$$\left. - l_r\left( + C_{\alpha r,k-1}\left(\delta_{r,k-1} - \beta_{k-1} + l_r \frac{\dot{\psi}_{k-1}}{V_x}\right)\cos\delta_{r,k} + F_{xr,k}\sin\delta_{r,k}\right) \right],$$

$$f_3 = C_{\alpha f,k-1},$$

$$f_4 = C_{\alpha r,k-1}.$$

Measurement Equations ($y_k$) — 108

$$h_1 = \dot{\psi}_k,$$
$$h_2 = C_{\alpha f,k}\left(\delta_{f,k} - \beta_{k-1} - l_f \frac{\dot{\psi}_k}{V_x}\right)\cos\delta_{f,k},$$
$$h_3 = C_{\alpha r,k}\left(\delta_{r,k} - \beta_{k-1} - l_r \frac{\dot{\psi}_k}{V_x}\right)\cos\delta_{r,k}.$$

- The state vector $x_k$, at each time instant $k$, comprises of sideslip angle, yaw rate, front tire cornering stiffness, rear tire cornering stiffness
- The measurement vector $y_k$, comprises of yaw rate, front and rear wheels lateral forces:

FIG–9C

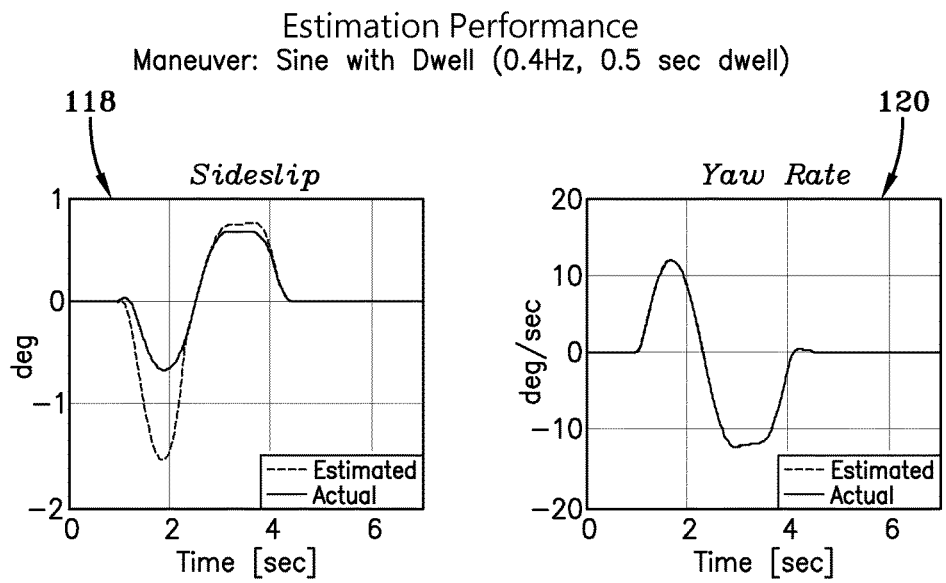
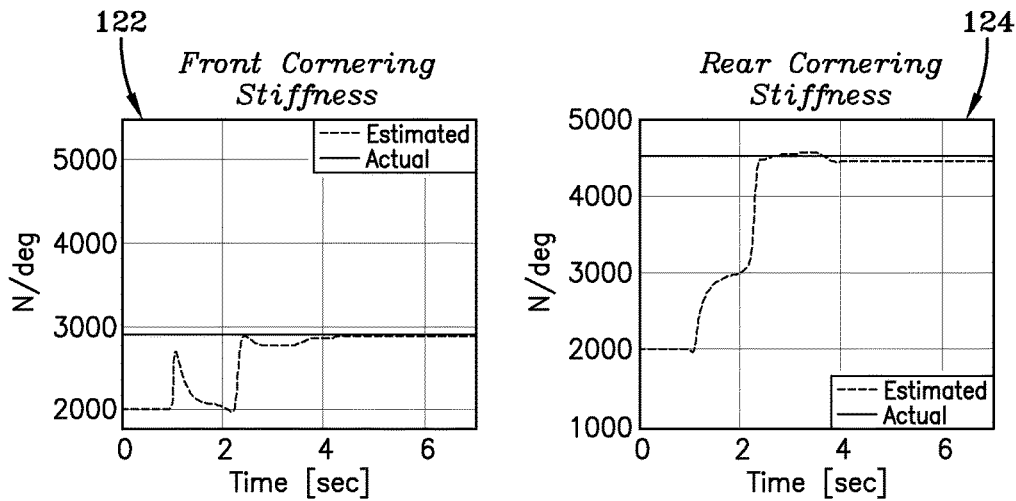
FIG-11A  FIG-11B
FIG-11C  FIG-11D

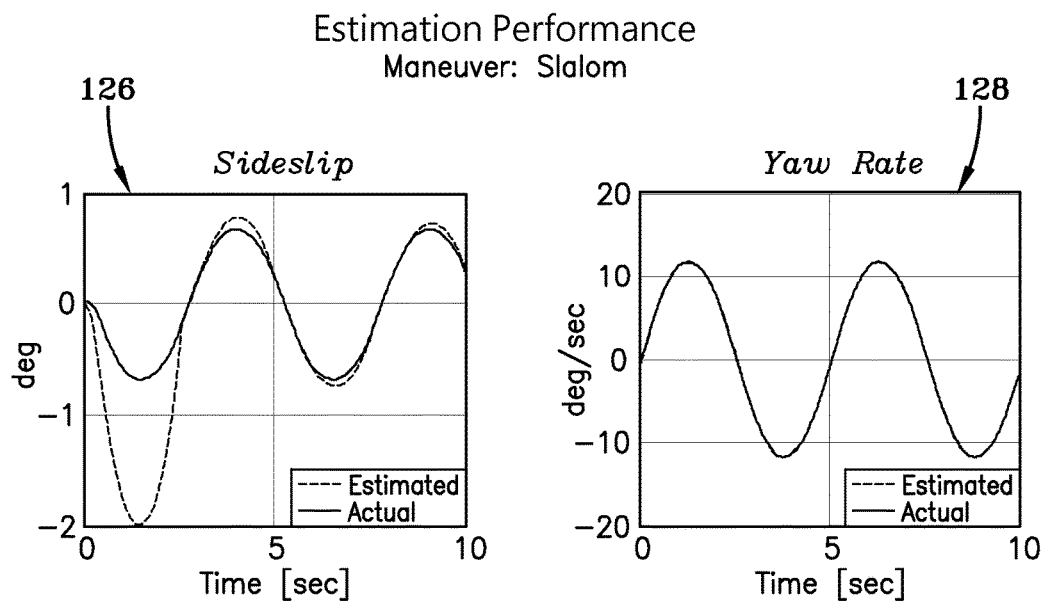
FIG-12A
FIG-12B
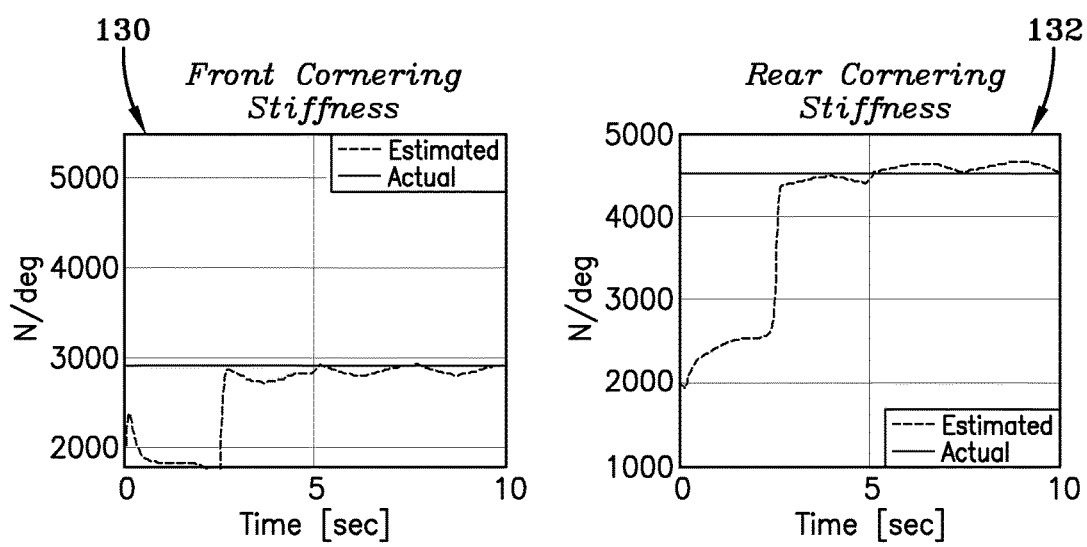
FIG-12C
FIG-12D

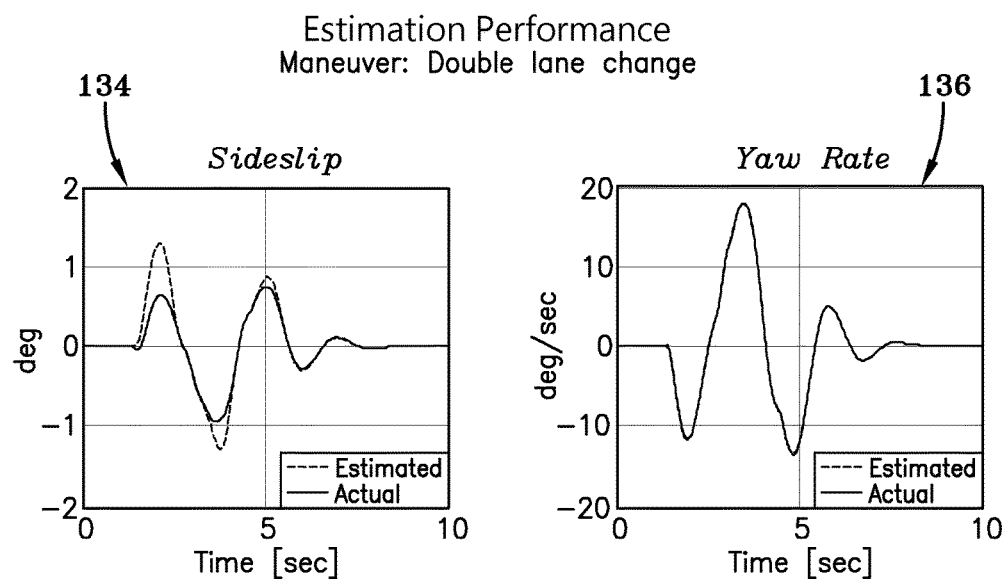
FIG-13A
FIG-13B
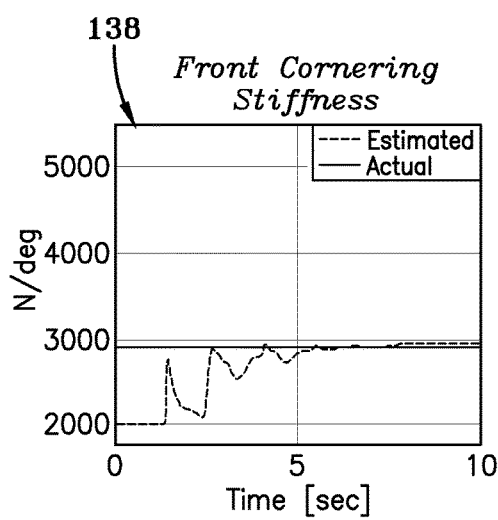
FIG-13C
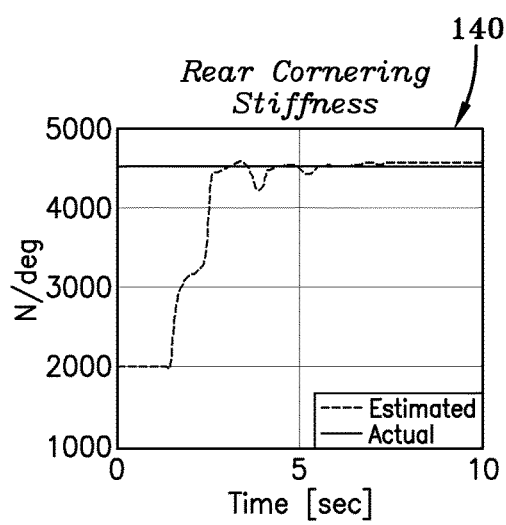
FIG-13D

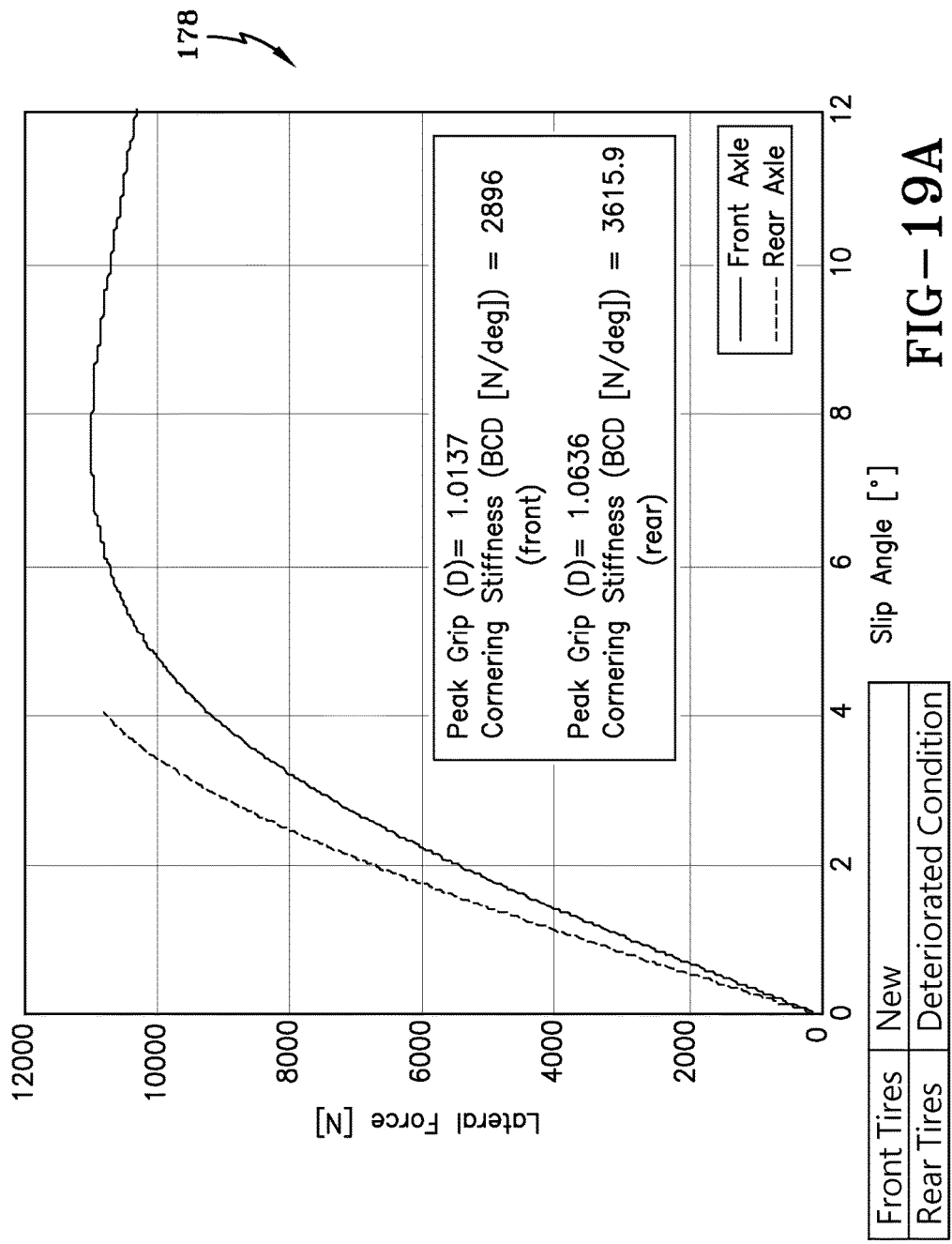

TIRE AND VEHICLE SENSOR-BASED VEHICLE STATE ESTIMATION SYSTEM AND METHOD

FIELD OF THE INVENTION

The invention relates generally to systems for indirectly estimating a vehicle's state conditions such as vehicle sideslip angle, inertial parameters and tire cornering stiffness.

BACKGROUND OF THE INVENTION

A vehicle's state conditions such as inertial parameters may vary from different driving conditions such as the number of passengers and the seating arrangement. Variation in the vehicle's inertial parameters may consequently affect the accuracy of vehicle state estimator models that are employed in vehicle control and stability systems. It is, accordingly, desirable to be able to compensate in real time for variation in a vehicle's inertial parameters in vehicle state estimators. Real time knowledge of such inertial variations is useful in many active vehicle safety applications, including yaw stability control and rollover prevention.

SUMMARY OF THE INVENTION

According to an aspect of the invention a vehicle state estimation system and method for a tire supported vehicle provides an analysis of transient maneuver states and non-transient maneuver states throughout operational maneuvers of the vehicle. The system includes one or more tire-based sensors mounted to axle-mounted vehicle tire(s) generating tire-based sensor data and one or more vehicle-based sensors mounted to the vehicle generating vehicle-based sensor data. An observer model is configured to make cornering stiffness estimates from the tire-based sensor data and the vehicle-based sensor data throughout the operational maneuvers of the vehicle. A cornering stiffness identifier is provided in the system to identify and extract only the transient-state cornering stiffness estimates from the cornering stiffness estimates made by the observer model throughout the operational maneuvers of the vehicle.

In another aspect, the cornering stiffness identifier operates to extract from the identified and extracted transient-state cornering stiffness estimates an optimal transient-state cornering stiffness estimate having a substantially highest confidence measure for use by a vehicle control system.

Pursuant to a further aspect, the tire-based sensor data includes a pressure measurement of tire inflation pressure and a temperature measurement of tire temperature and the vehicle-based sensor data includes vehicle lateral acceleration rate, yaw rate, and steering wheel angle.

The system and method, in another aspect, uses a tire load estimator for estimating a vertical force on the vehicle tires from the tire-based sensor data and an inertial parameter generator to generate a real-time update of vehicle inertial parameters from the vertical force estimation throughout vehicle maneuvers. The system further utilizes an axle force estimator to estimate from the vehicle inertial parameters and the vehicle-based sensor data an axle lateral force estimation for use by the observer model.

Definitions

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"CAN bus" or "controller area network" is a vehicle bus standard designed to allow microcontrollers and devices to communicate with each other within a vehicle without a host computer. CAN bus is a message-based protocol, designed specifically for automotive applications.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Kalman Filter" is a set of mathematical equations that implement a predictor-corrector type estimator that is optimal in the sense that it minimizes the estimated error covariance—when some presumed conditions are met.

"Lateral" means an axial direction.

"Lateral edges" means a line tangent to the axially outermost tread contact patch or footprint as measured under normal load and tire inflation, the lines being parallel to the equatorial centerplane.

"Luenberger Observer" is a state observer or estimation model. A "state observer" is a system that provide an estimate of the internal state of a given real system, from measurements of the input and output of the real system. It is typically computer-implemented, and provides the basis of many practical applications.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Slip Angle" is the angle between a vehicle's direction of ravel and the direction in which the front wheels are pointing. Slip angle is a measurement of the deviation between the plane of tire rotation and the direction of travel of a tire.

"Tread element" or "traction element" means a rib or a block element defined by having a shape adjacent grooves.

"Tread Arc Width" means the arc length of the tread as measured between the lateral edges of the tread.

"Vibration Spectral Analysis" is a methodology for analyzing a machine vibration spectrum using velocity, displacement, acceleration versus frequency.

BRIEF DESCRIPTION OF THE DRAWINGS

The invention will be described by way of example and with reference to the accompanying drawings in which:

FIG. 5A is a Sideslip Estimation schematic that uses a Kinematics Based Approach.

FIG. 5B is a schematic vehicle representation identifying parameters used in the Kinematics Based Approach.

FIG. 8 is a flow chart showing the use of Tire Load Information to directly estimate all inertia parameters necessary for a two-wheel lateral vehicle dynamics model.

FIG. 9C are representations of the State Equations and Measurement Equations employed.

FIGS. 11A through 11D are Estimation Performance graphs (Maneuver: Sine with Dwell 0.4 Hz, 0.5 sec. Dwell) for estimated vs. actual Sideslip, Yaw Rate, Front Cornering Stiffness and Rear Cornering Stiffness, respectively.

FIGS. 12A through 12D are Estimation Performance graphs (Maneuver: Slalom) for estimated vs. actual Sideslip, Yaw Rate, Front Cornering Stiffness and Rear Cornering Stiffness, respectively.

FIGS. 13A through 13D are Estimation Performance graphs (Maneuver: Double Lane Change) for estimated vs. actual Sideslip, Yaw Rate, Front Cornering Stiffness and Rear Cornering Stiffness, respectively.

FIG. 19A is a graph for the condition Front Tires New and Rear Tires Deteriorated, plotting lateral force against slip angle.

DETAILED DESCRIPTION OF THE INVENTION

Figure 1:
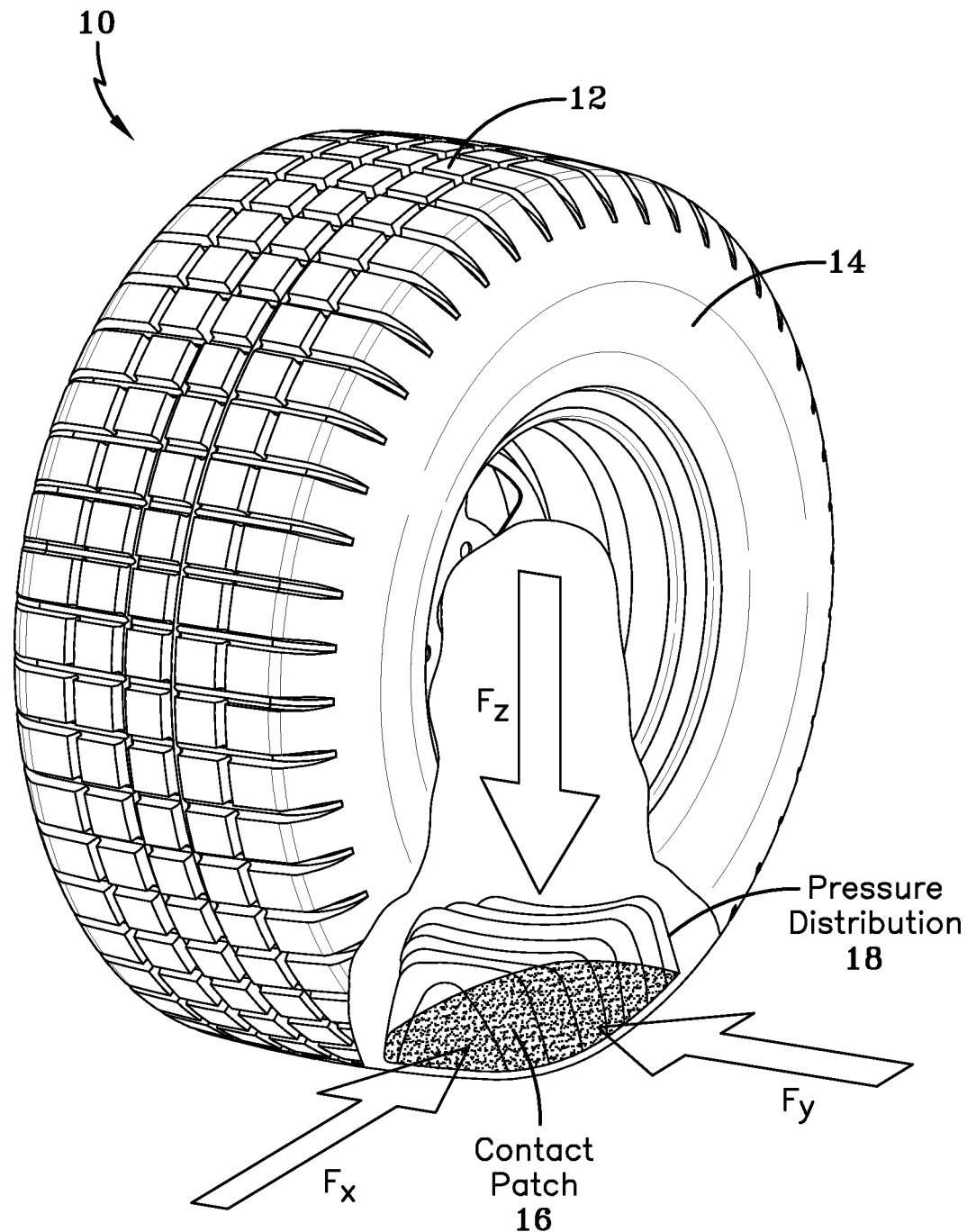
FIG. 1 is a perspective view of a representative vehicle tire showing pressure distribution within a contact patch.

Referring first to FIG. 1, a representative vehicle tire 10 is shown having a tread 12 and sidewalls 14. The tire forms a contact patch 16 as it rolls over a road or ground surface creating a pressure distribution 18 over the patch area. Forces in X, Y and Z planes are created, $F_z$ representing vertical force on the tire 10. Different driving conditions, such as the number of passengers and seating arrangement cause the vehicle inertial parameters to vary and consequently affect the accuracy of any vehicle state estimator (VSE). The objective and problem solved by the subject vehicle state estimation system and method is the improvement of the performance of a vehicle state estimator, specifically estimates of the vehicle body sideslip angle and tire cornering stiffness. The system and method measures vertical force $F_z$ using "intelligent" tires. By "intelligent", it is meant tires that are equipped with one or more sensors from which vertical force $F_z$ may be derived. Knowledge of $F_z$ enables estimation of mass (m), longitudinal center of gravity position (a, b), yaw moment of inertia ($I_z$); namely all the inertial parameters needed for applied use in a conventional two wheel vehicle model.

Figure 2:
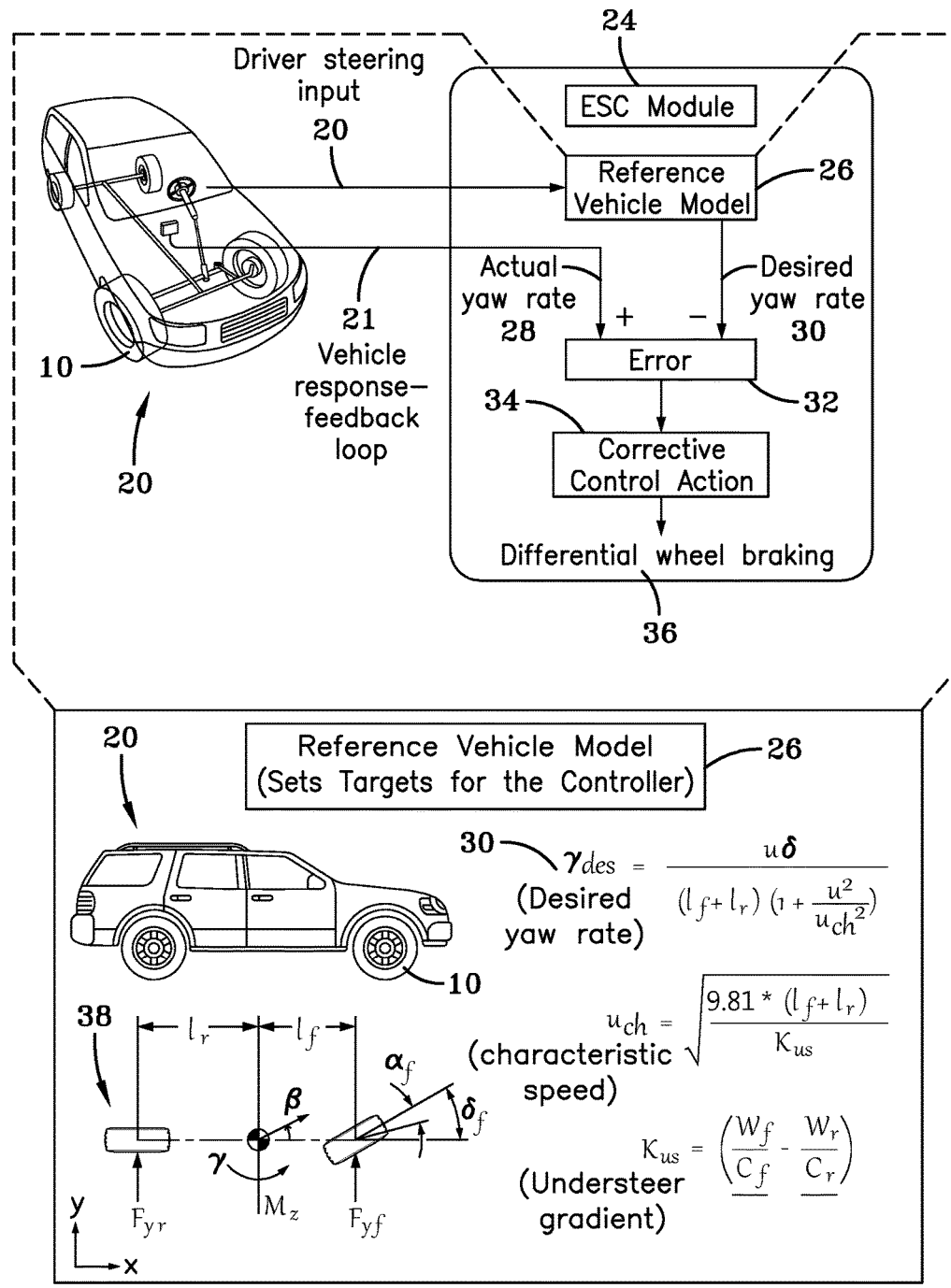
FIG. 2 is a schematic representation of the electronic steering control module and its use in controlling braking and a schematic representation of a Reference Vehicle Model and how such a model sets targets for the controller.

Cornering stiffness and vehicle sideslip angle are important because of their use in vehicle electronic system control modules (ESC) in vehicle control systems such as differential wheel braking. FIG. 2 shows schematically a vehicle 20 equipped with multiple tires 10. Driver steering input 22 is detected from driving steering actions and input into an ESC module 24. A reference vehicle model 26 sets targets for the controller. The reference vehicle model 26 generates a desired yaw rate 30 that is compared against actual yaw rate 28 provided by a feedback vehicle response loop 21 to determine error 32. From the error 32 computation, corrective control action 34 is instituted, resulting in control of differential wheel braking 36.

FIG. 2 shows in detail the reference vehicle model 26 that sets targets for the vehicle controller. The two-wheel vehicle model 38 identifies vehicle inertial parameters including yaw rate γ. Formulas for desired yaw rate 30, characteristic speed and understeer gradient are set forth in FIG. 2. The desired yaw rate depends on the vehicle understeer characteristic, which depends mainly on the cornering stiffness of the tires. Cornering stiffness of the tires changes with the tire type, make, state (new or worn, pressure, temperature, loading state). Determining cornering stiffness accordingly is important but problematic given the tire variables affecting cornering stiffness.

Figure 3:
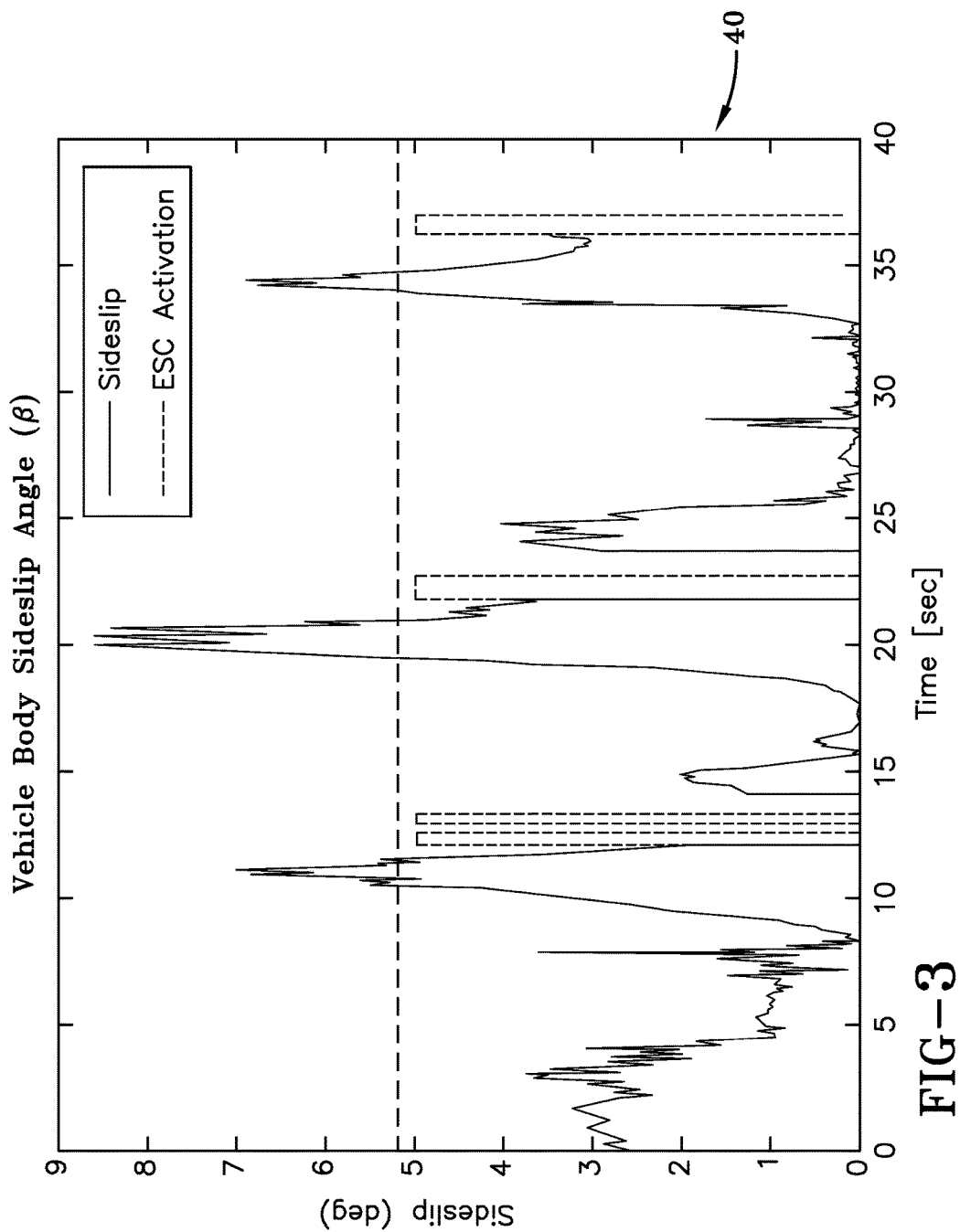
FIG. 3 is a graph showing the importance of sideslip angle to vehicle stability, graphing sideslip angle (deg) over time and showing graphically ESC Activation.

Sideslip angle is likewise important as will be appreciated from the graph 40 of FIG. 3, plotting sideslip (deg) and ESC activation over time. As seen, high sideslip angle is a clear indicator of an imminent critical situation, i.e. ESC activation. Real-time knowledge of the sideslip angle of a vehicle is useful in many active vehicle safety applications, including yaw stability control and rollover prevention. Measurement of sideslip angle, however, requires a complex and expensive sensor system and is generally cost prohibitive for many applications.

Tire cornering stiffness ($C_y$) is an important dynamic parameter because it plays an important factor in designing an ESC system, estimation of vehicle states and determination of lateral force saturation. In the determination of control law to enhance the handling of road vehicles, most of the ESC systems use constant corning stiffness as input to the system. However, in real working situations, cornering stiffness varies due to change in tire-road friction and tire wear. Therefore, it is important to obtain these dynamic parameters for robust working of ESC systems.

Tracking of sideslip angle (β) is also required along with tracking of yaw rate for satisfactory lateral dynamics response. Sideslip control along with yaw rate control is required for satisfactory steering and stability of a vehicle.

However, measurement of sideslip angle is not possible due to a lack of a vehicle sideslip angle sensor that is both accurate and economical enough to be implemented. Several strategies may be used to estimate sideslip angle based on state observers. The procedures rely on tire models and evaluation of its parameters. These approaches can lead to good estimation but only if the tire parameters are correctly identified. Correct identification of tire parameters, however, can prove problematic if changes occur in tires' cornering stiffness due to different friction conditions or to the tire wear. Such changes may significantly affect the estimation and result in error.

The model based observer method has higher accuracy in the linear tire region and it is robust against sensor bias. The estimation depends on vehicle parameters like vehicle mass, inertia and tire parameters such as cornering stiffness. It is difficult to identify these parameters in real-time, making a model-based estimation algorithm unreliable over all driving situations.

A direct sensor integration is a kinematic based approach in contrast to a model-based approach. A differential relation between the sideslip angle and vehicle's measurable dynamic parameters is obtained using the kinematic approach. Since the relation is differential, its application leads to a progressive drift during the integration process.

Figure 4:
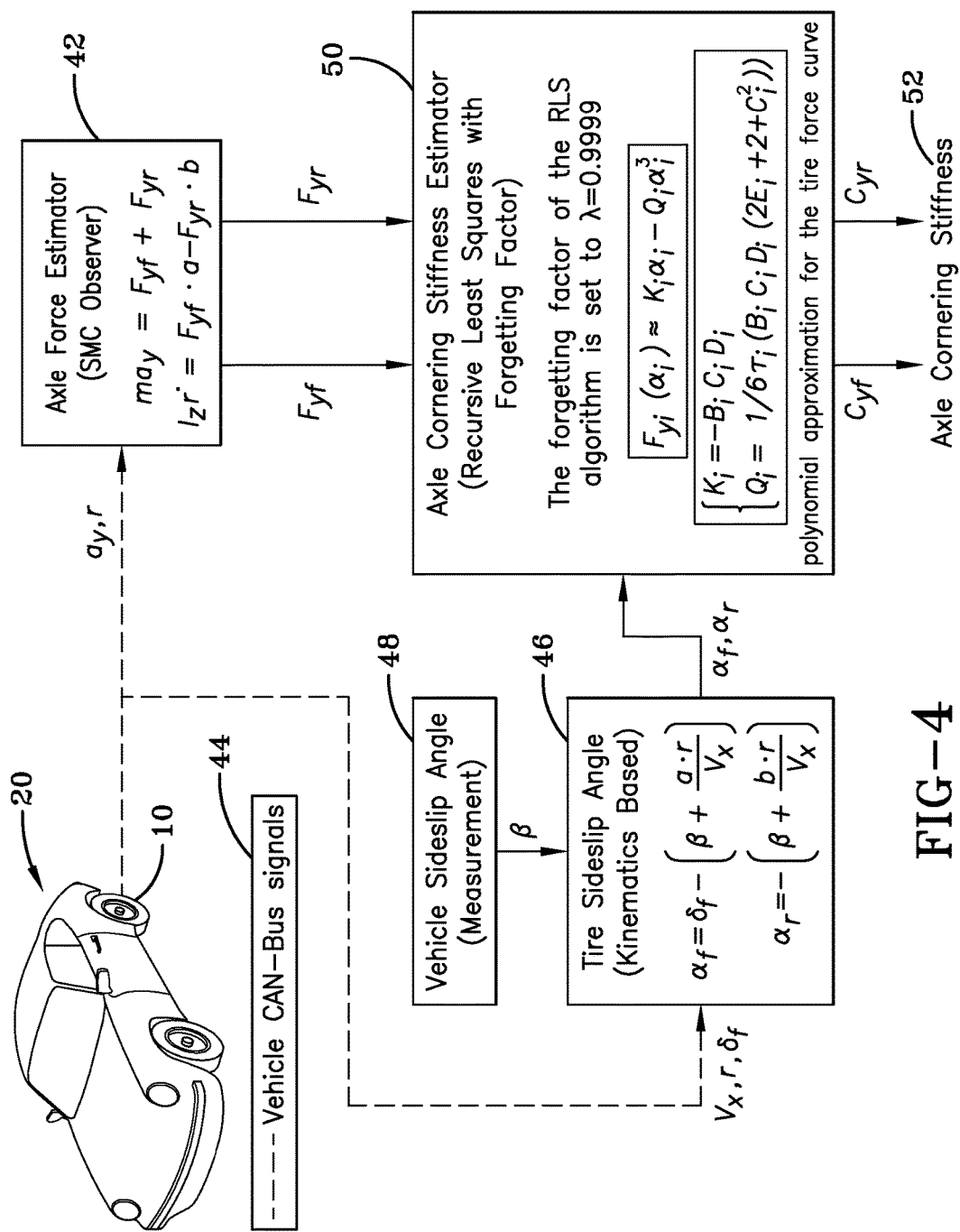
FIG. 4 is a schematic of a Cornering Stiffness Estimation that uses a Model Based Approach.

A system and method for cornering stiffness estimation using a model-based approach is shown generally in FIG. 4. A vehicle 20 is sensor-equipped to generate vehicle-based sensor data via CAN-bus signals $a_y$, r to an axle force estimator (SMC observer) 42 and signals $V_x$, $δ_f$, r to a tire sideslip angle (Kinematics based) model 46. Vehicle sideslip angle β (measurement) is likewise an input into the tire sideslip angle estimator 46. The estimator 46 through use of the algorithmic relationship shown generates $α_f$, $α_r$ as inputs into the axle cornering stiffness estimator 50 (recursive least squares with forgetting factor). The axle force estimator 42 generates through the algorithmic expressions indicated $F_{yf}$ and $F_{yr}$ for input into the axle cornering stiffness estimator 50. The forgetting factor of the RLS algorithm is set to λ=0.9999. The polynomial approximation for the tire force curve is as indicated in FIG. 4. The axle cornering stiffness estimator yields axle cornering stiffness estimations 52 $C_{yf}$ and $C_{yr}$ which will prove useful as described below.

A system and method for sideslip estimation using a kinematics-based approach is shown generally in FIGS. 5A and 5B. Vehicle sideslip angle is estimated using a simple integration method and the kinematical formula used is represented in FIG. 5A. Road bank angle and roll angle of the vehicle are used to determine measured $a_y$. A vehicle schematic 54 and methodology derivation is shown in FIG. 5B. A lateral accelerometer measurement consists of three components, namely the lateral motion term, the linear motion term and the gravity term according to the algorithm indicated. This method is robust against variations in vehicle inertial parameters and tire-road conditions. The limitations of using a kinematics-based approach, however, is that such an approach is very sensitive to the sensor bias errors from lateral acceleration, yaw rate and road bank angle. The estimated slip angle will drift over time no matter how small the sensor bias error is.

Figure 5C:
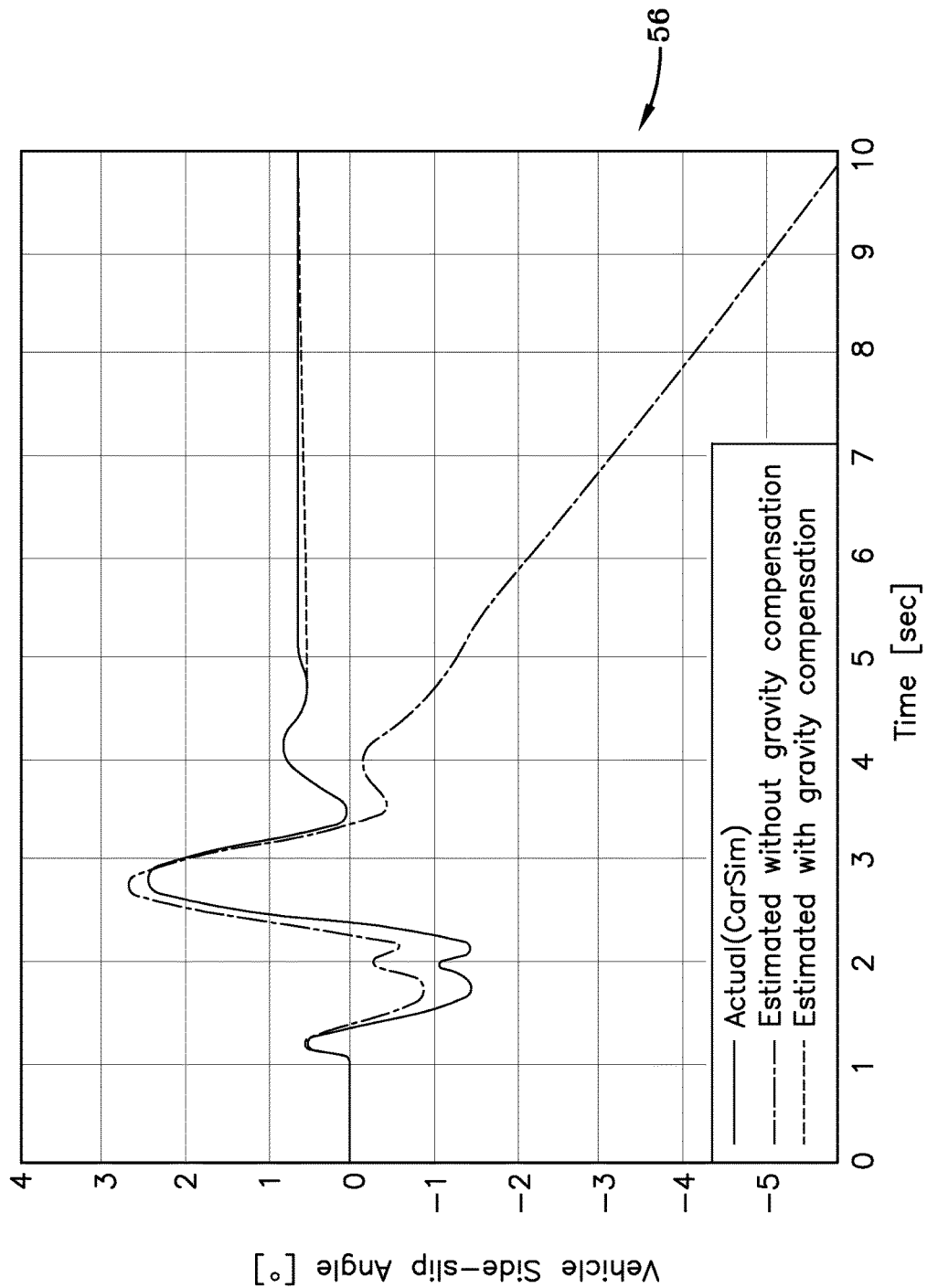
FIG. 5C is a graph showing vehicle side-slip angle over time for the Kinematics Based Approach, graphing actual, estimated without gravity compensation, and estimated with gravity compensation.
Figure 6:
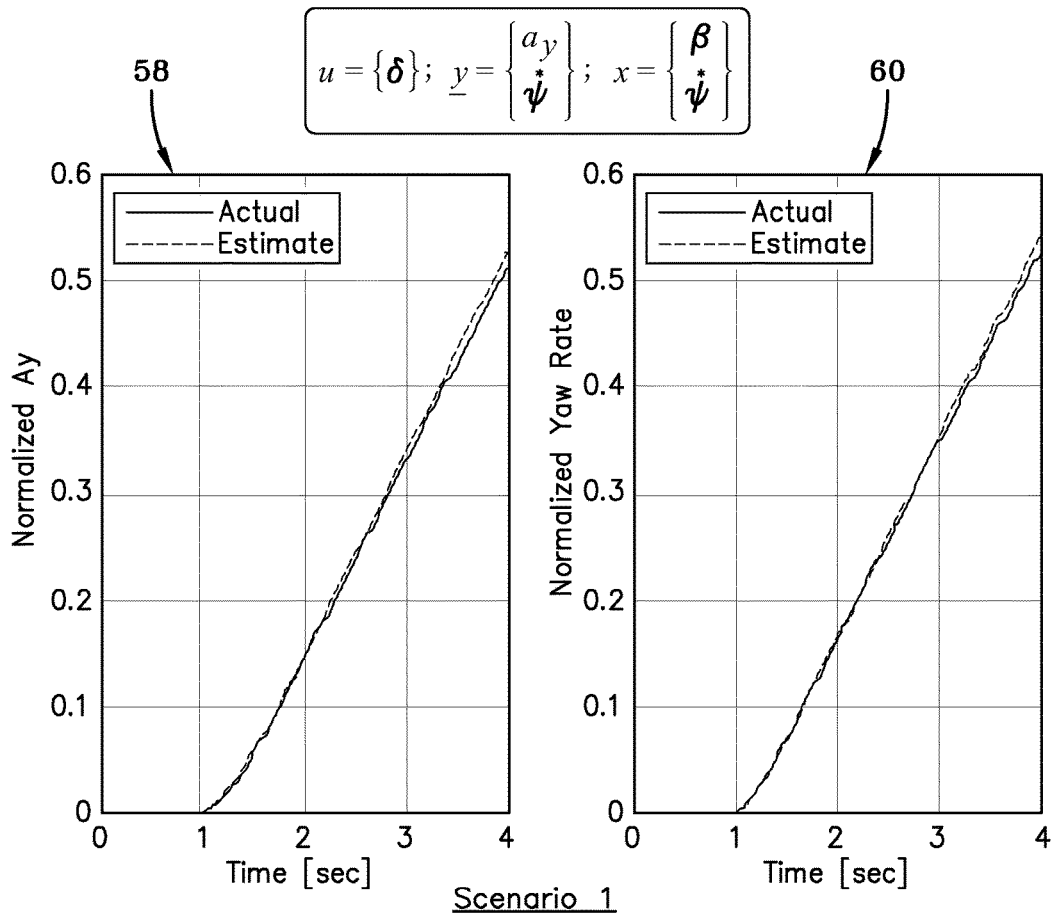
FIG. 6 is a Sideslip Estimation system and experimental result graphs and table using a sideslip estimation approach and demonstrating limitations inherent therein.

FIG. 5C shows a vehicle side-slip angle graph 56 over time, comparing actual (car sim), estimated without gravity compensation, and estimated with gravity compensation. In FIG. 6, limitations with using the above-described sideslip estimation methodology using a model-based approach is further highlighted for scenario 1 (sideslip underestimated) and scenario 2 (sideslip overestimated). Graphs 58, 60 are shown comparing actual to estimate for $A_y$ and yaw rate respectively. A strong relation exists between sideslip angle and tire cornering stiffness. For example, as an extreme case, a corner can be covered at constant speed with the same values of lateral acceleration and yaw rate but with different values of β, depending only on the tire cornering stiffness. In Scenario 1, sideslip is underestimated and cornering stiffness overestimated, resulting in axle forces that are still estimated correctly (i.e. track lateral acceleration and yaw feedback). In Scenario 2, the sideslip is overestimated and cornering stiffness underestimated, again resulting in axle forces that are still estimated correctly. The table at the bottom of FIG. 6 shows and compares actual vs. estimate (N/deg). From the FIG. 6 analysis, it can be concluded that a critical aspect of the sideslip state observer as described above is related to the tuning of the cornering stiffness of the tires which are unknown quantities.

Figure 7:
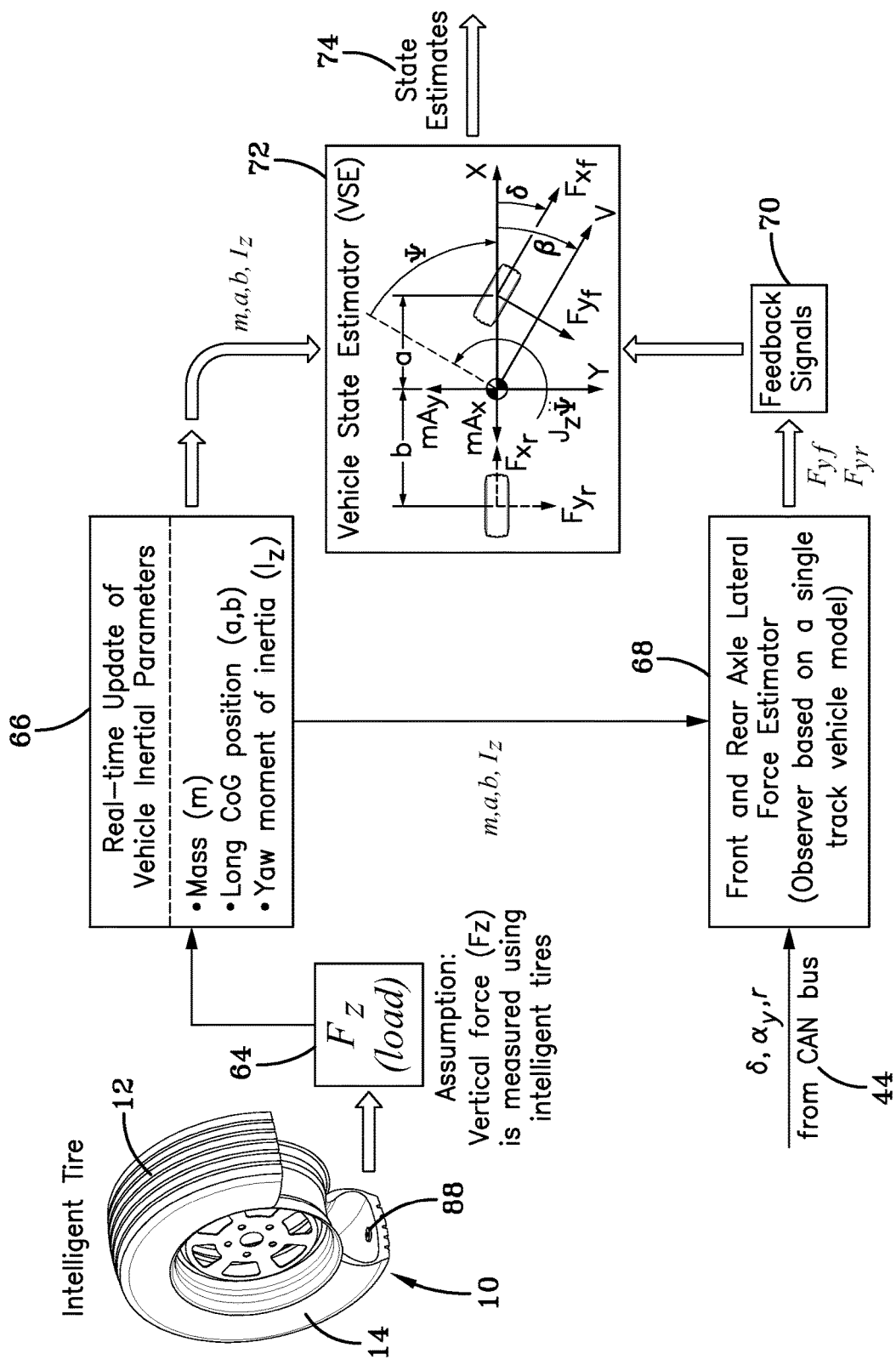
FIG. 7 is a system schematic of the subject State Estimate System and Method.

The subject invention system and method is depicted schematically in FIG. 7, using the following Nomenclature.
δ: steering wheel angle
$a_y$ lateral acceleration
r: yaw rate
a: CoG to front axle distance
b: CoG to rear axle distance
$I_z$: yaw moment of inertia
$F_{yf}$: front axle lateral force
$F_{yr}$: rear axle lateral force An "intelligent" tire 10 is defined herein as a tire equipped with one or more sensors for determining a vertical force $F_z$ (load) 64 on the tire. The sensor and tire assembly may, for example, utilize the approach taught by U.S. Pat. No. 8,661,885 entitled TIRE SIDEWALL LOAD ESTIMATION SYSTEM AND METHOD (hereby incorporated herein in its entirety by reference); U.S. Pat. No. 8,844,346 entitled TIRE LOAD ESTIMATION SYSTEM USING ROAD PROFILE ADAPTIVE FILTERING (hereby incorporated herein in its entirety by reference); pending U.S. Patent Application Serial No. 2014/0114558, filed Oct. 19, 2012 entitled VEHICLE WEIGHT AND CENTER OF GRAVITY ESTIMATION SYSTEM AND METHOD (hereby incorporated herein in its entirety by reference); and pending U.S. Patent Application Serial No. 2014/0260585 filed Mar. 12, 2013 entitled TIRE SUSPENSION FUSION SYSTEM FOR ESTIMATION OF TIRE DEFLECTION AND TIRE LOAD (hereby incorporated herein in its entirety by reference). Other known sensor-based technologies mounted to a tire for the purpose of determining tire loading may be employed without departing from the invention.

The intelligent tire determines load Fz (vertical force) on the tire. $F_z$ is applied in real-time to update the vehicle inertial parameters 66 of mass (m), longitudinal center of gravity position (a, b) and yaw moment of inertia ($I_z$). The updated real-time vehicle inertial parameters are applied to a vehicle state estimator (VSE) 72 and to a front and rear axle lateral force estimator 68. The estimator 68 is configured as an observer based on a single track vehicle model 68. Additional inputs to the estimator 68 are vehicle sensor-derived CAN Bus parameters (44) of δ, $a_y$, r. The estimator 68 generates feedback signals (70) $F_{yf}$ and $F_{yr}$ to the vehicle state estimator (VSE) 72 which produces the real-time updated state estimates 74.

It will be appreciated that tire load information is used to directly estimate the following vehicle states:
Vehicle mass (m)—summation of the tire static loads;
CG longitudinal position (a, b)—longitudinal center of gravity (CoG) position can be obtained by measuring the load on the front tires and rear tires;

Yaw moment of inertia (Izz)—using regression equations that approximate moments of moments of inertial.

Figure 9A:
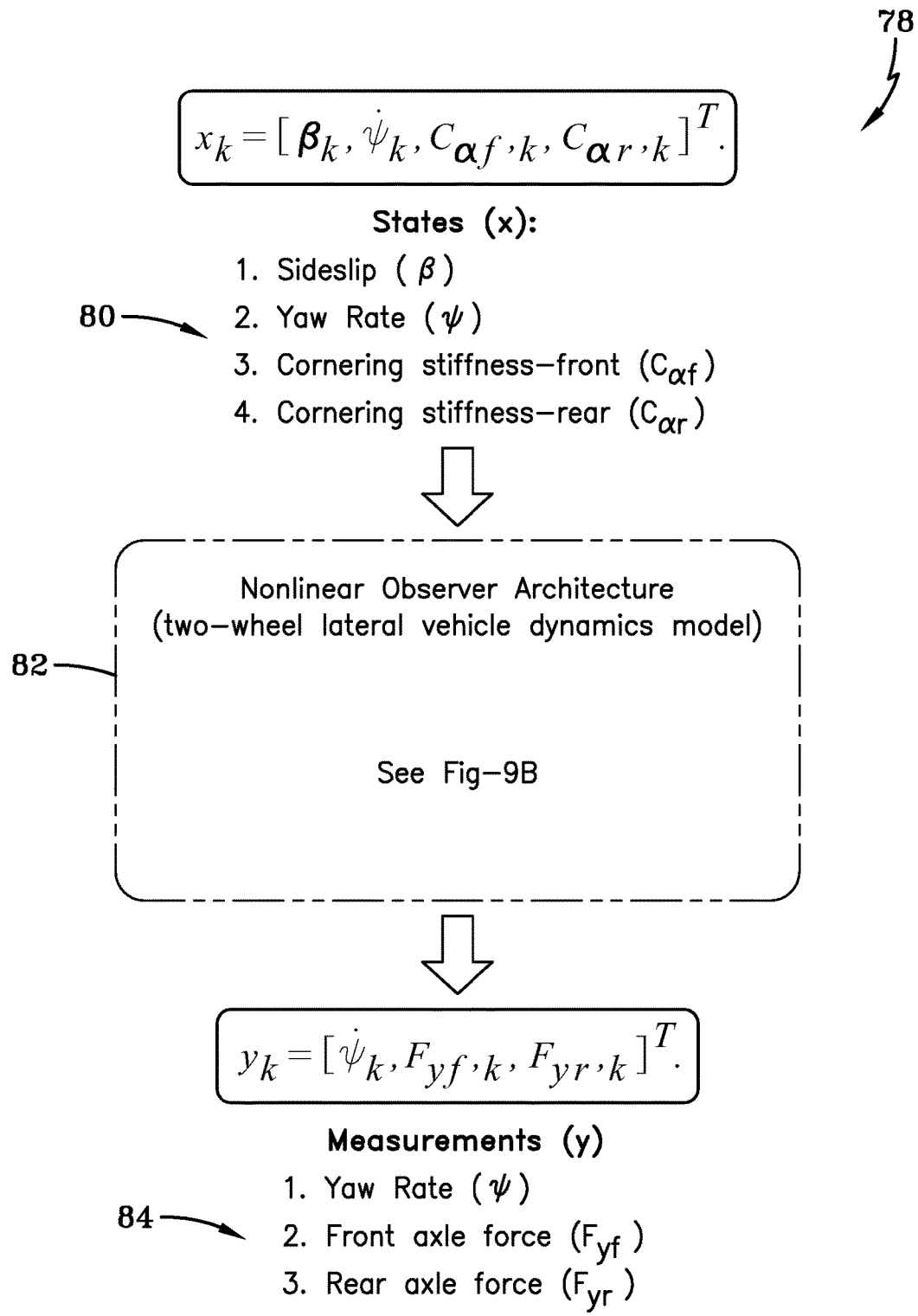
FIG. 9A is a flow chart showing derivation of the State Parameters applying the discrete-time Unscented Kalman Filter (UKF) for state estimation.

FIG. 8 shows that all the inertia parameters needed for the two-wheel lateral vehicle dynamics model 76 depicted may be derived pursuant to the subject invention from tire load information. The equations shown in FIG. 8 are used in obtaining the yaw moment of inertia of the vehicle as well as the CoG determination of a, b. FIG. 9A shows the identification expression 78 of states (x), listed at 80. The states (x) 80 include sideslip (β); yaw rate (γ); cornering stiffness front ($C_{\alpha f}$); and cornering stiffness rear ($C_{\alpha r}$).

To build a model based UKF, the nonlinear bicycle model equations and linear tire model equations have been converted to discrete form by first-order Euler method as indicated by expressions for $x_k$ (80) and $y_k$ (84) shown in FIG. 9A. The state vector $x_k$, at each time instant k, comprises sideslip angle, yaw rate, front tire cornering stiffness, and rear tire cornering stiffness. The measurement vector $y_k$, comprises yaw rate, and front and rear wheels lateral forces.

Figure 9B:
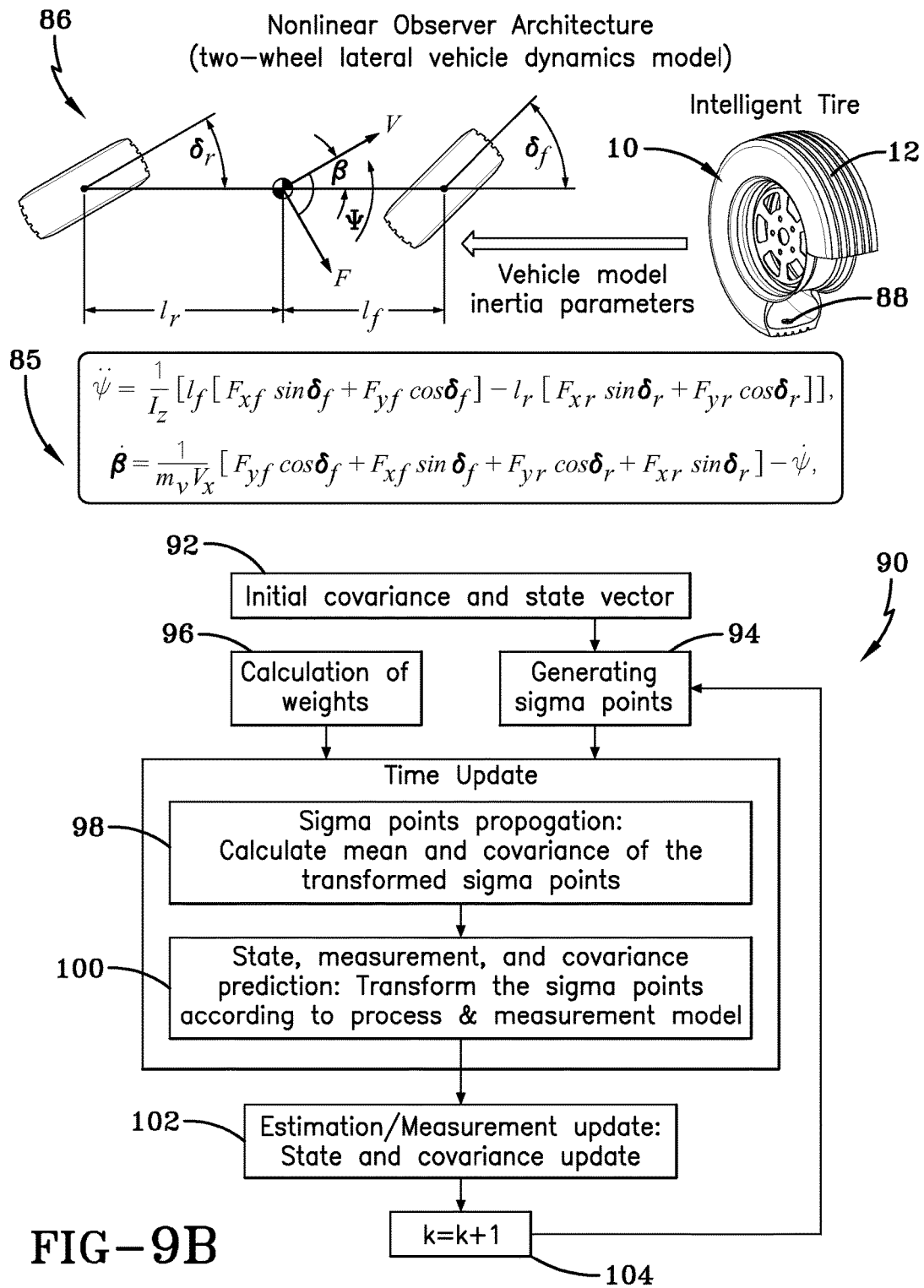
FIG. 9B is diagram of the Nonlinear Observer Architecture employed in the subject invention for a two-wheel lateral vehicle dynamics model; and a flow chart of the UKF algorithm.

The Nonlinear Observer Architecture 82 for a two-wheel lateral vehicle dynamics model 86 is shown in FIG. 9B. An intelligent tire 10 has mounted thereto a tire pressure monitoring device 88 of a type commercially available. The device 88 is suitably mounted to the tire 10 such as to the tire inner liner defining the tire cavity. From techniques taught by U.S. Patent Application Serial No. 2014/0114558, and pending U.S. Patent Application Serial No. 2014/0260585, incorporated herein in their entirety above, inertia parameters may be ascertained via measurement of the vertical force (load) on the tire. The vehicle model inertial parameters are applied to the model 86. The algorithms represented at 85 apply the discrete-time unscented Kalman filter (UKF) for state estimation. The underlying discrete-time non-linear state-space model is based on the two-wheel lateral vehicle dynamics model 86 implementing the yaw rate and sideslip equations 85 shown.

The UKF algorithm will be further understood by reference to the flowchart 90 shown in FIG. 9B. A representative two-wheel lateral vehicle dynamics model 86 is superimposed above the flowchart 90 with vehicle state equations 85 beneath. The tire pressure monitoring device 88 is of a type commercially available and mounted to the tire in a suitable location such as adhered to the tire innerliner. The device 88 includes a pressure sensor operative to monitor tire cavity air pressure and transmit pressure data from the tire to a remote device such as a computer (not shown) for electronic analysis and data processing. The device 88 may further include a tire identification or ID tag (not shown) of a commonly used and available commercial type that can mount to the tire and transmit a unique tire-identifying electronic code to a remote device for tire identification. From such identification the construction type and characteristics of the particular tire may be ascertained from stored information within the device.

The flowchart 90 begins with an initial covariance and state vector 92 from which sigma points 94 are generated. The sigma points 94 and a calculation of weights 96 are processed through a time update. Sigma points propagation 98 is conducted and mean and covariance of the transformed sigma points calculated. A state, measurement and covariance prediction 100 is made by transforming the sigma points according to a process and measurement model. From the prediction, updating 102 is conducted of state and covariance and the time instance is adjusted shown at 104.

The goal of the preceding methodology and system is to analyze the accuracy of the nonlinear filter designed to estimate the sideslip angle and tire cornering stiffness. The algorithm applies the discrete-unscented Kalman Filter (UKF) shown in FIG. 9B for state estimation. The underlying discrete-time non-linear state-space model shown is based on the two-wheel lateral vehicle dynamics model 86.

To build a model-based UKF, the nonlinear bicycle mode equations and the linear tire model equations are converted to discrete form by first-order Euler method as follows:

$$X_k = f_{k-1}(x_k, u_k) + v_k$$

$$Y_k = h(x_k, u_k) + w_k$$

FIG. 9C shows at 106 state equations ($x_k$) and at 108 measurement equations ($y_k$). The state vector $x_k$, at each time instant k, is comprised of sideslip angle, yaw rate, front tire cornering stiffness and rear tire cornering stiffness. The measurement vector $y_k$ is comprised of yaw rate, front and rear wheels lateral forces. It should be noted that for satisfactory working of the UKF, it is important to tune the process noise covariance matrix Q and measurement noise covariance matrix R. The yaw rate and sideslip angle are modeled using system dynamic equations, therefore low uncertainty is assigned to them. However, the cornering stiffnesses are not modeled at all, hence, they are given high uncertainties.

Figures 10A, 10B:
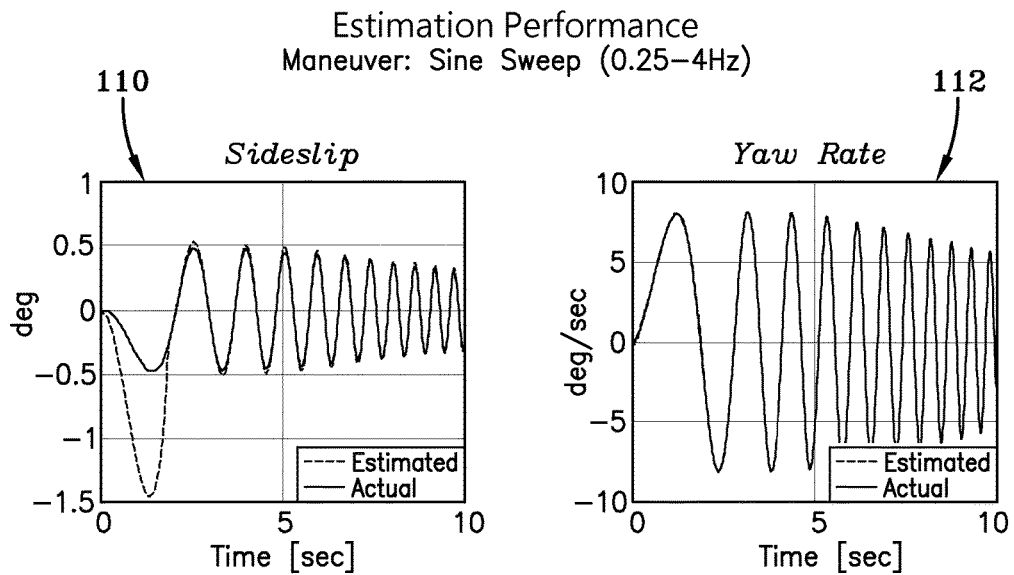
FIGS. 10A through 10D are Estimation Performance graphs (Maneuver: Sine Sweep 0.25-4 Hz) for estimated vs. actual Sideslip, Yaw Rate, Front Cornering Stiffness and Rear Cornering Stiffness, respectively.
Figures 10C, 10D:
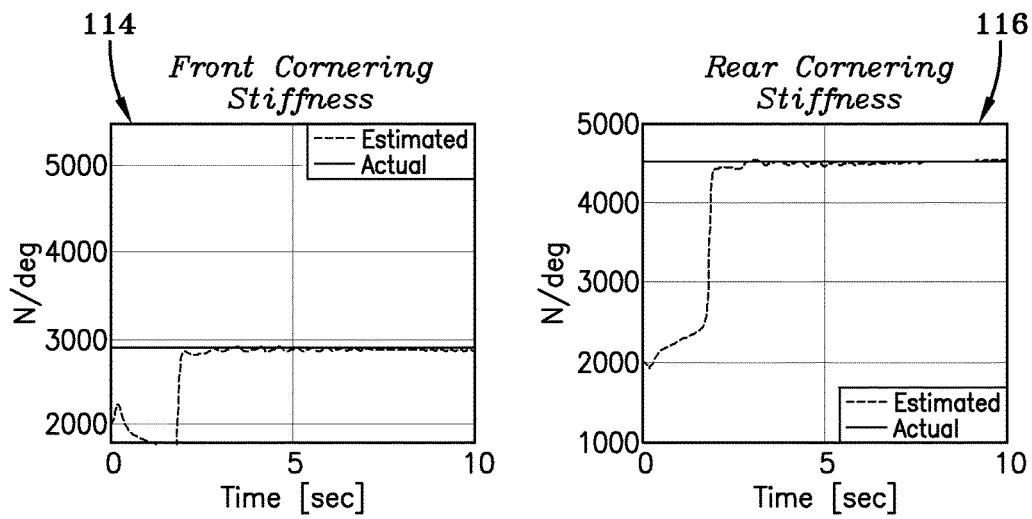
Figures 14A, 14B:
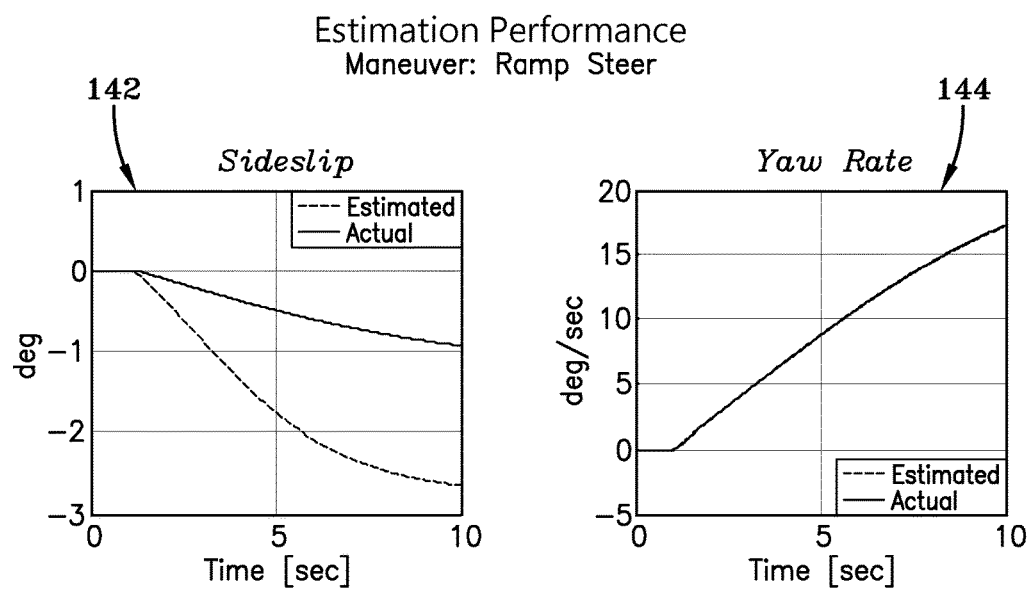
FIGS. 14A through 14D are Estimation Performance graphs (Maneuver: Ramp Steer) for estimated vs. actual Sideslip, Yaw Rate, Front Cornering Stiffness and Rear Cornering Stiffness, respectively.
Figures 14C, 14D:
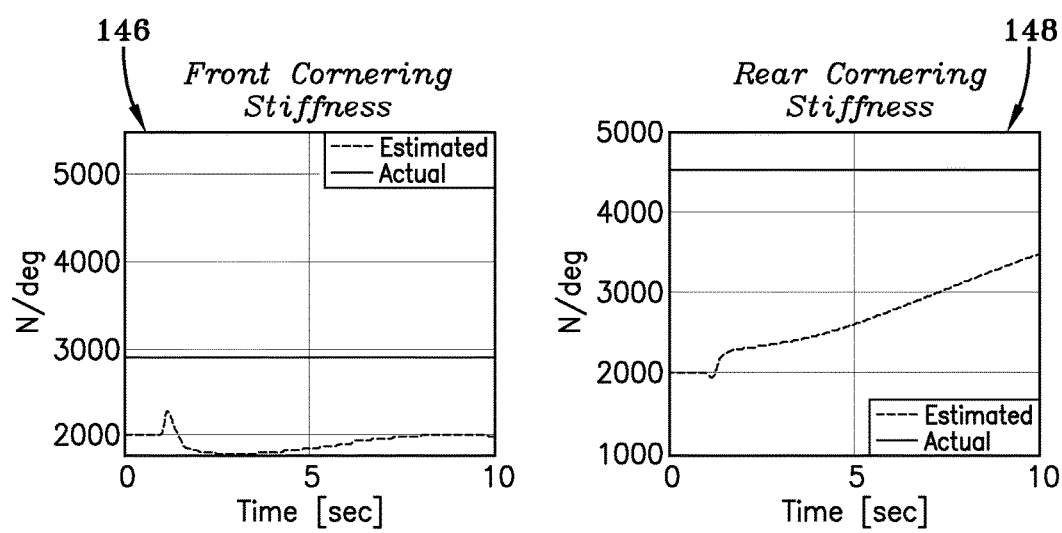
Figures 15A, 15B:
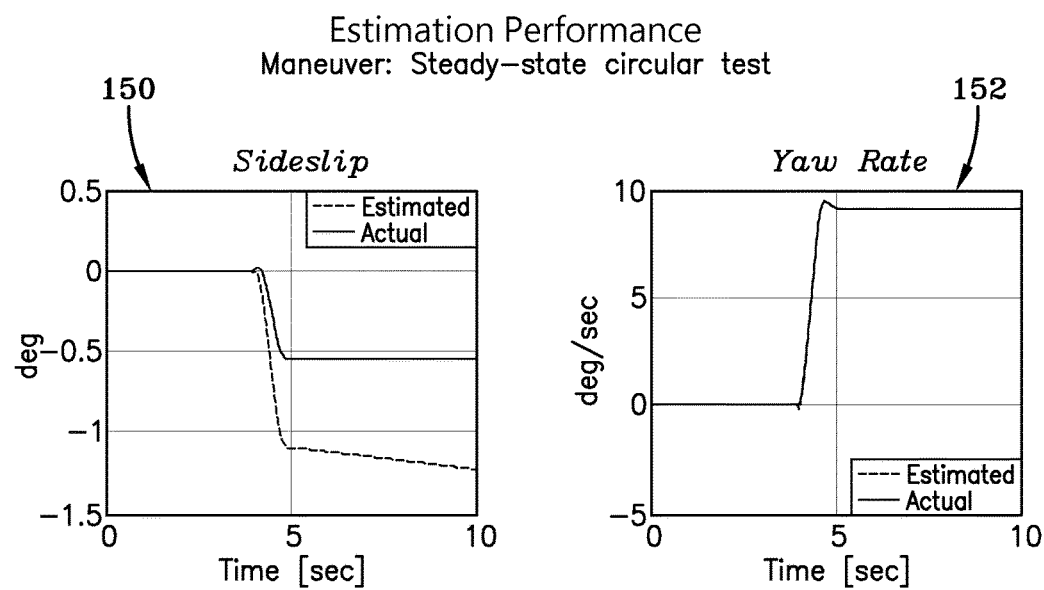
FIGS. 15A through 15D are Estimation Performance graphs (Maneuver: Steady-state Circular Test) for estimated vs. actual Sideslip, Yaw Rate, Front Cornering Stiffness and Rear Cornering Stiffness, respectively.
Figures 15C, 15D:
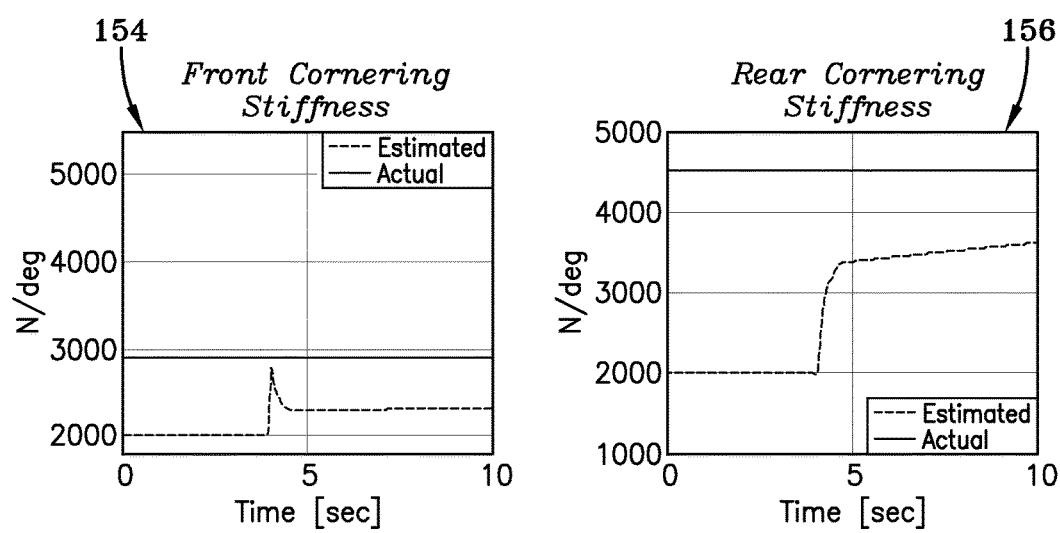

Tests were conducted using a summer tire, Goodyear Eagle F1 Asymmetric (255/45ZR19 for Front and 285/40ZR19 for the back) mounted on a Porsche Panamera automobile. Front and rear axle tire data was used for lateral force and slip angle comparison with estimated results. Estimation performance is reflected in the graphs 110, 112, 114 and 116 of FIGS. 10A through 10D. The maneuver used to evaluate estimation performance was a sine sweep at 0.25-4 Hz. In graph 110 of FIG. 10A, estimated vs. actual plots of sideslip degrees over time is shown. In graph 112 of FIG. 10B, yaw rate plots of estimated vs. actual are shown in deg./sec. over time. In FIG. 10C, front cornering stiffness estimated vs. actual 114 is shown in N/deg. over time. FIG. 10D graph 116 shows rear cornering stiffness of estimated vs. actual. A good convergence between estimated and actual is demonstrated.

In FIGS. 11A through 11D, the same tests were run for a sine with dwell maneuver, using 0.4 Hz and 0.5 sec. dwell. Again good convergence between estimated and actual was seen in graphs 118, 120, 122 and 124. In FIGS. 12A through 12D, graphs 126, 128, 130 and 132 indicate similar good convergence in a rerun of the test using a slalom maneuver. Likewise, good convergence in an additional test using a double lane change is reflected in the performance graphs 134, 136, 138, and 140 of FIGS. 13A through 13D. Graphs 142, 144, 146 and 148 reflected in FIGS. 14A through 14D for a ramp steer maneuver test; and graphs 150, 152, 154 and 156 reflected in FIGS. 15A through 15D for a steady-state circular test demonstrate less convergence between estimated and actual results.

Figure 16A:
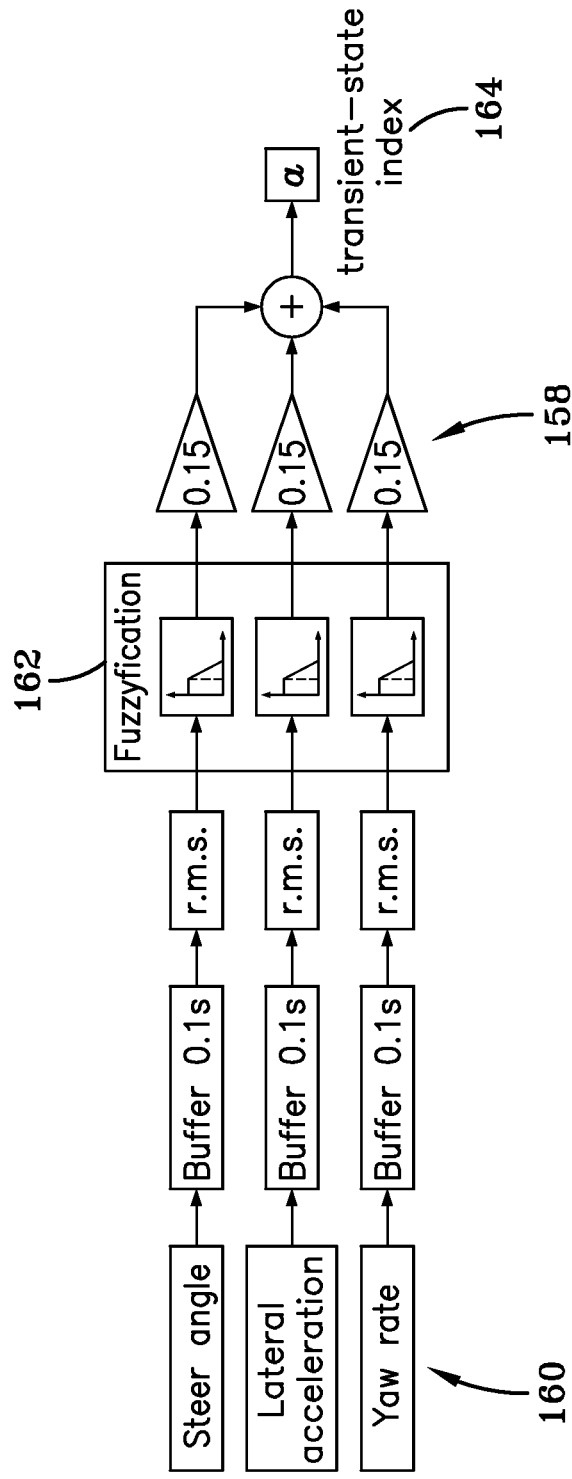
FIG. 16A is a flow chart showing a Transient State Estimator scheme.
Figure 16B:
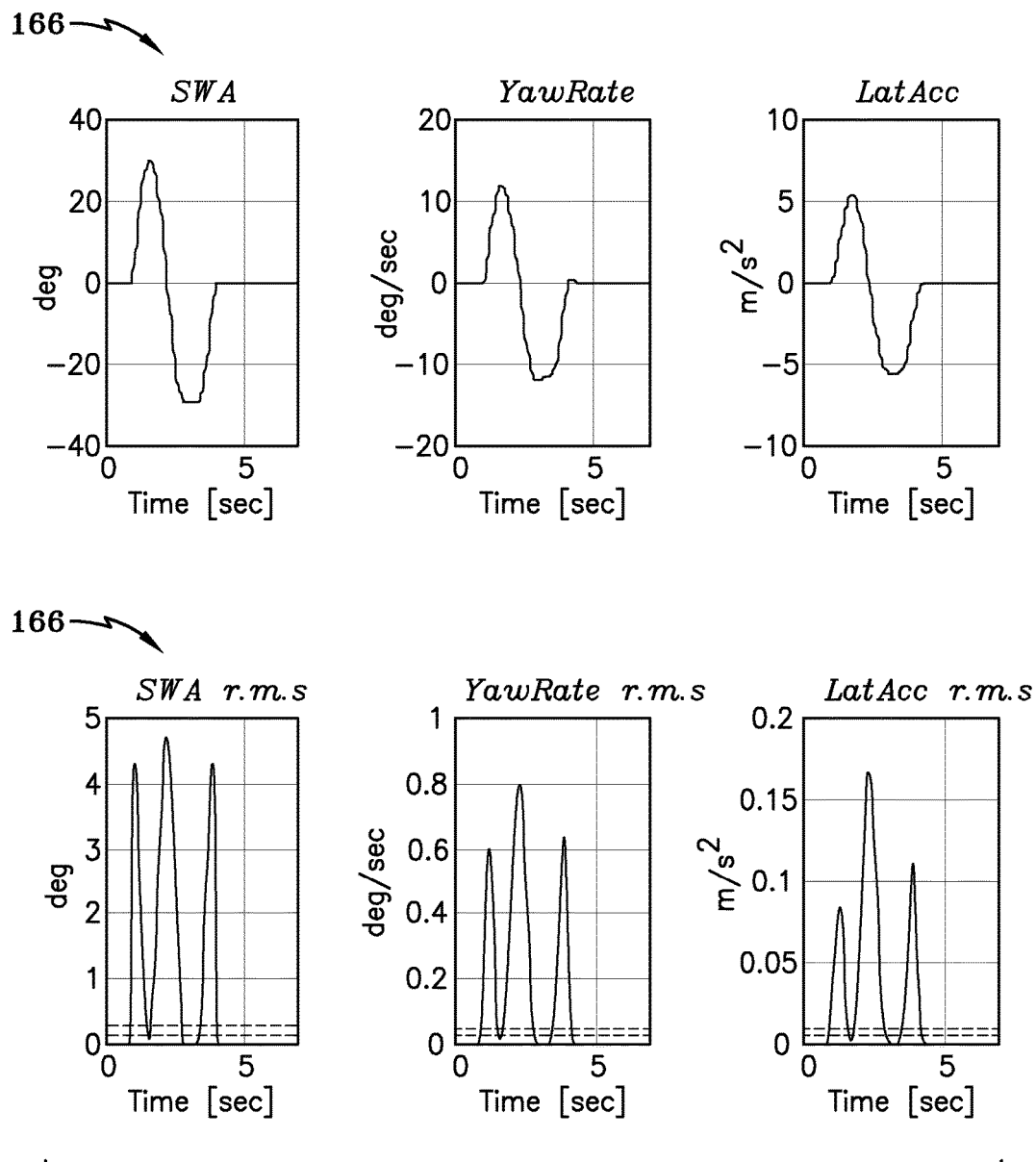
FIG. 16B are graphs showing Transient State Estimation for Steer Wheel Angle, Yaw Rate and Lateral Acceleration.

The reason for less convergence in the steady-state circular test is that estimation accuracy of the algorithm is limited to transient maneuvers. It does not give the same results in non-transient maneuvers. A scheme is shown in FIG. 16A for use in determining a transient-state index, i.e. to determine the time instants when the vehicle is undergoing a transient maneuver as opposed to non-transient maneuvers. The root mean square (r.m.s.) of steer angle, lateral acceleration and yaw rate constitute inputs to a fuzzy logic network 162 that outputs a transient-state index 164 ($\alpha$). FIG. 16B illustrates the use of the state index by comparing steering wheel angle (SWA), yaw rate and lateral acceleration 166 graphs with r.m.s. adjusted values for steering wheel angle, yaw rate and lateral acceleration.

Figure 16C:
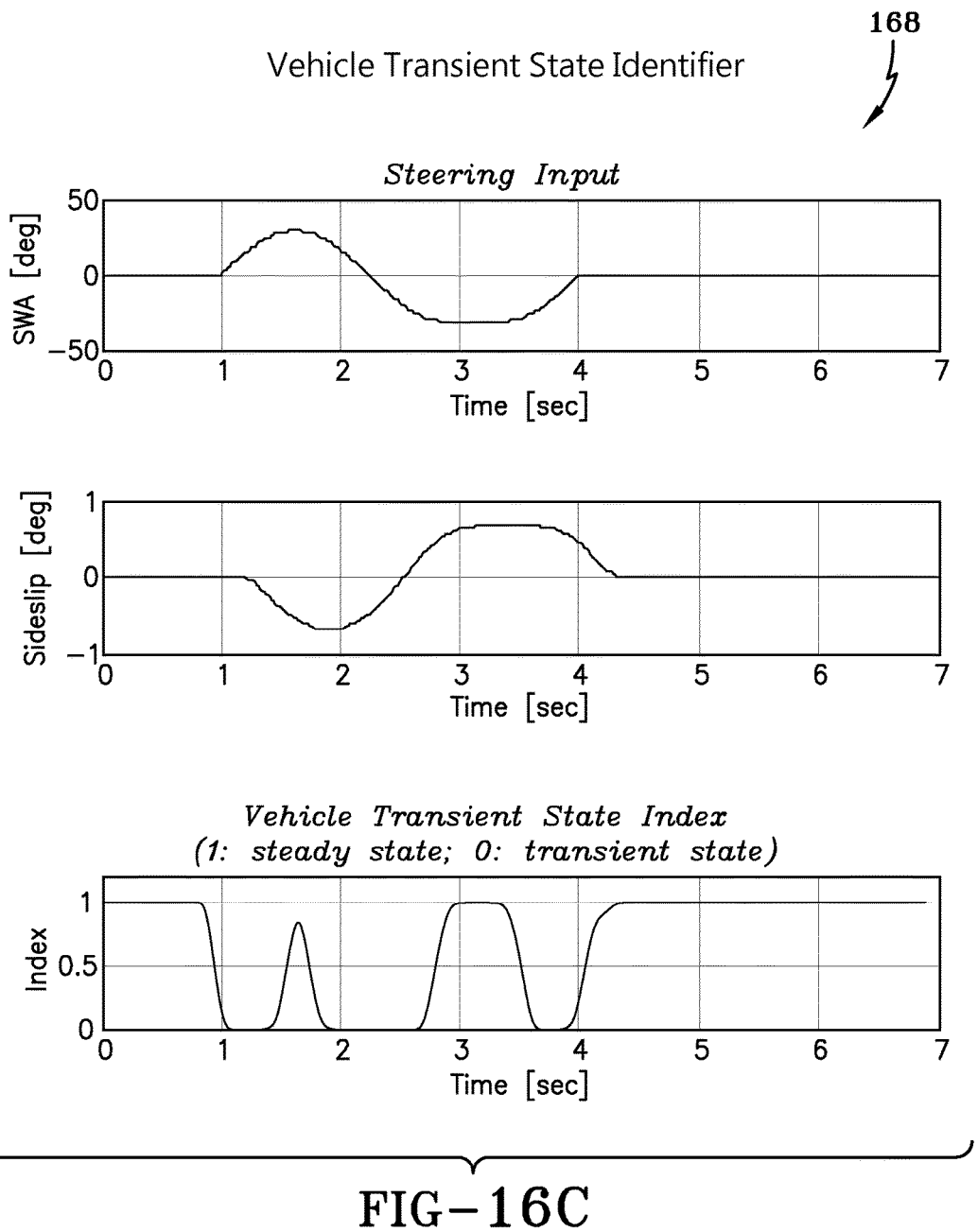
FIG. 16C are graphs showing Vehicle Transient State Identifier derived from the Vehicle Transient State Estimation of FIG. 16B.

In FIG. 16C, use of the vehicle transient state identifier is shown by the graphs 168 of steering wheel angle over time and sideslip over time. The vehicle transient state index of 1: steady state, and 0: transient state is shown graphically. The graph of the transient index over time shows the value of the transient-state index computed according to the logic described above.

Figure 17A:
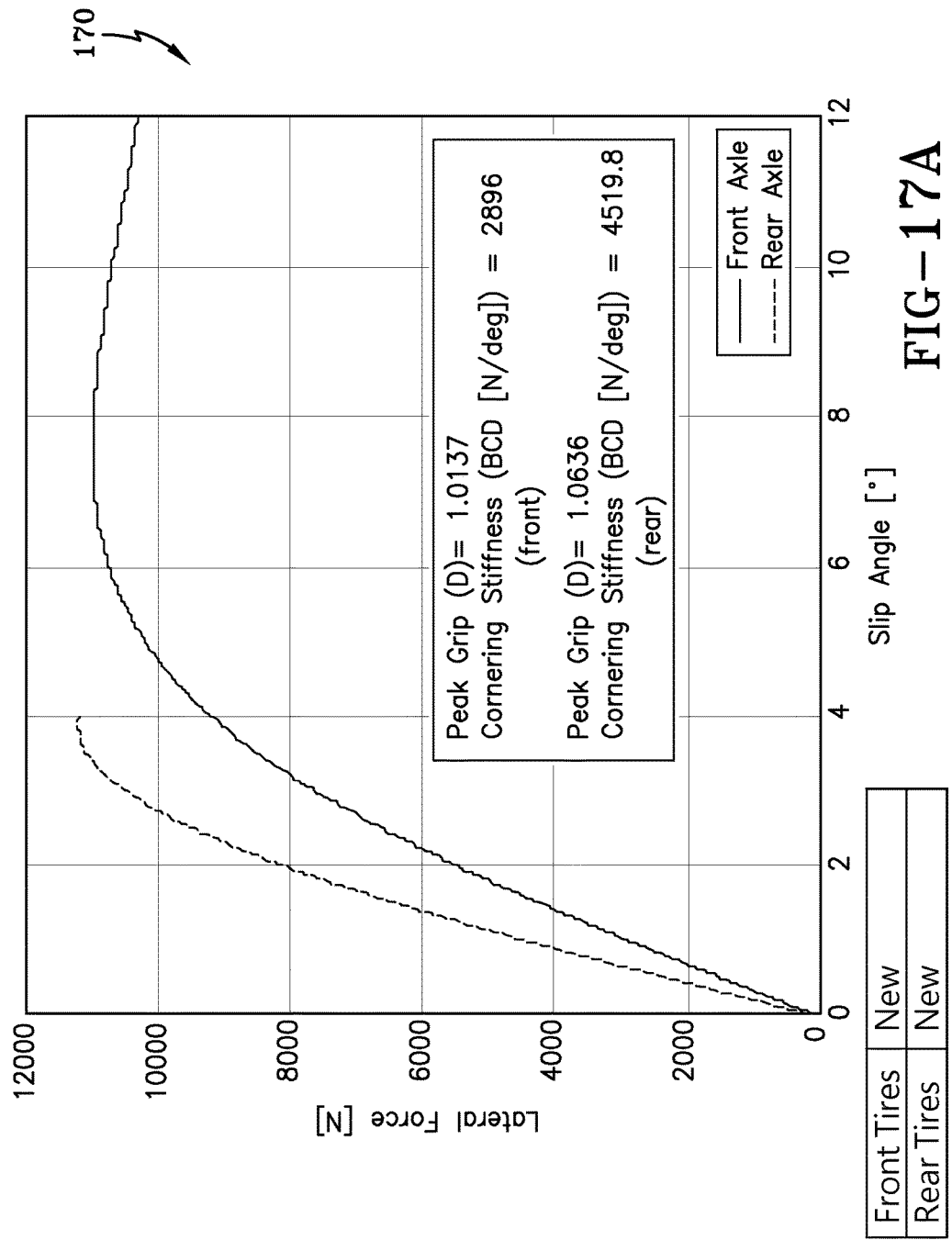
FIG. 17A is a graph of Lateral Force vs. Slip Angle for New Front and Rear Tires.

The graph 170 of lateral force vs. slip angle in FIG. 17A is for front and rear axles. New tires were used in a test that extracts cornering stiffness estimates during the transient state of the vehicle and statistically extracts the cornering stiffness estimate with the highest confidence measure. Peak grip and cornering stiffness for the front and rear tires is given in FIG. 17A.

Figure 17B:
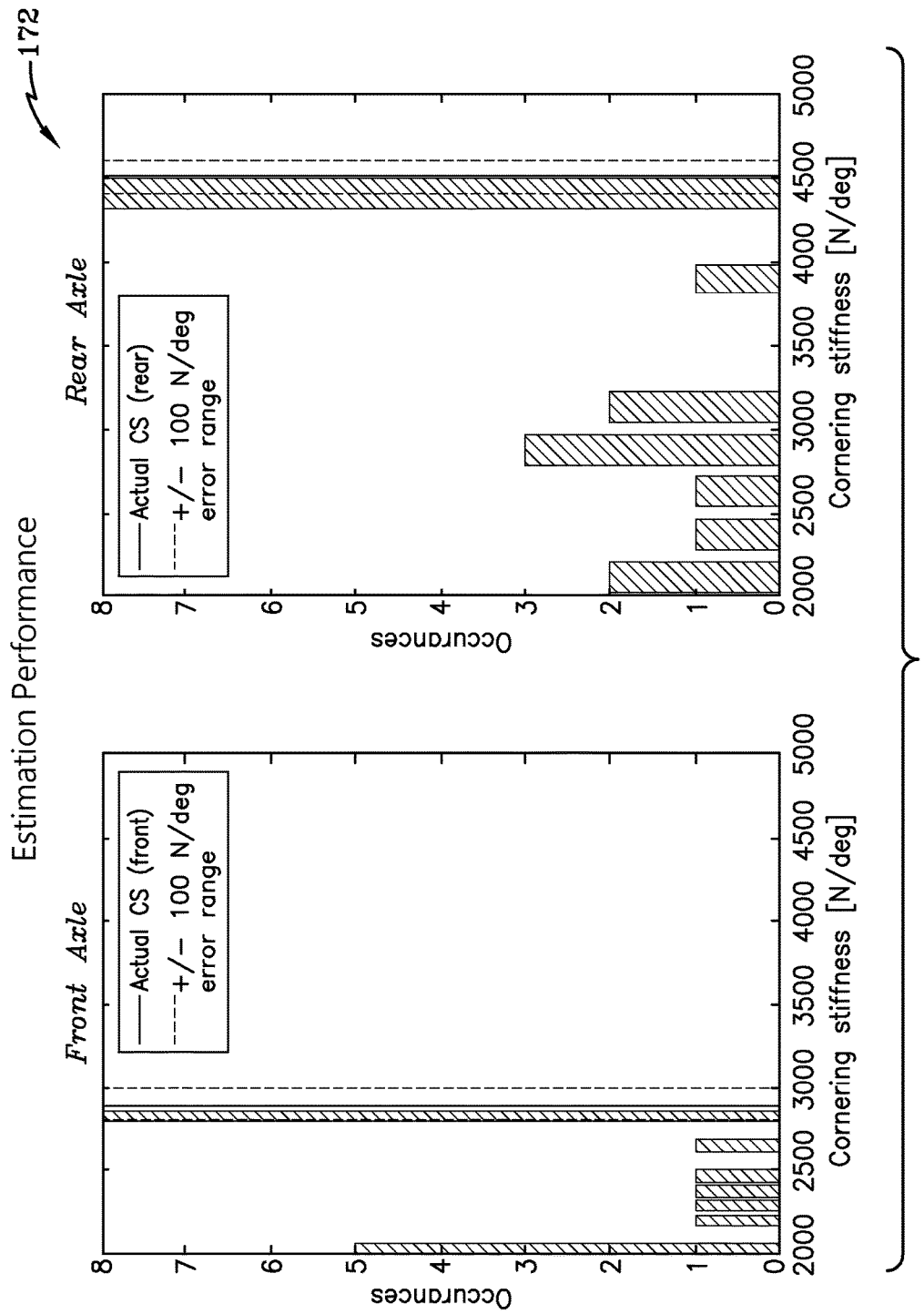
FIG. 17B are graphs of Estimation Performance for front and rear axles, plotting occurrences against cornering stiffness for actual and error band.
Figure 18A:
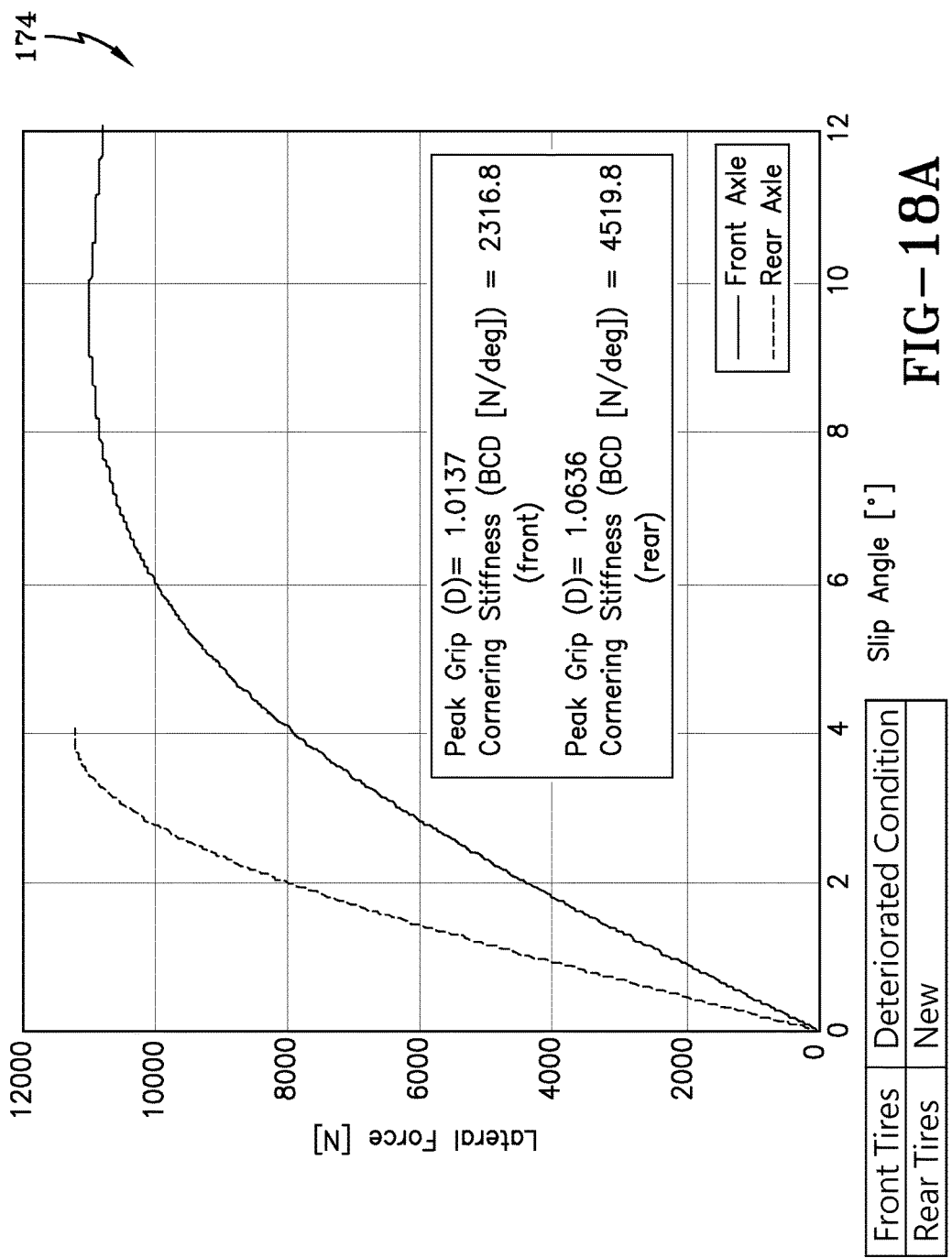
FIG. 18A is a graph of lateral force against slip angle for deteriorated front tire and new rear tire conditions.
Figure 18B:
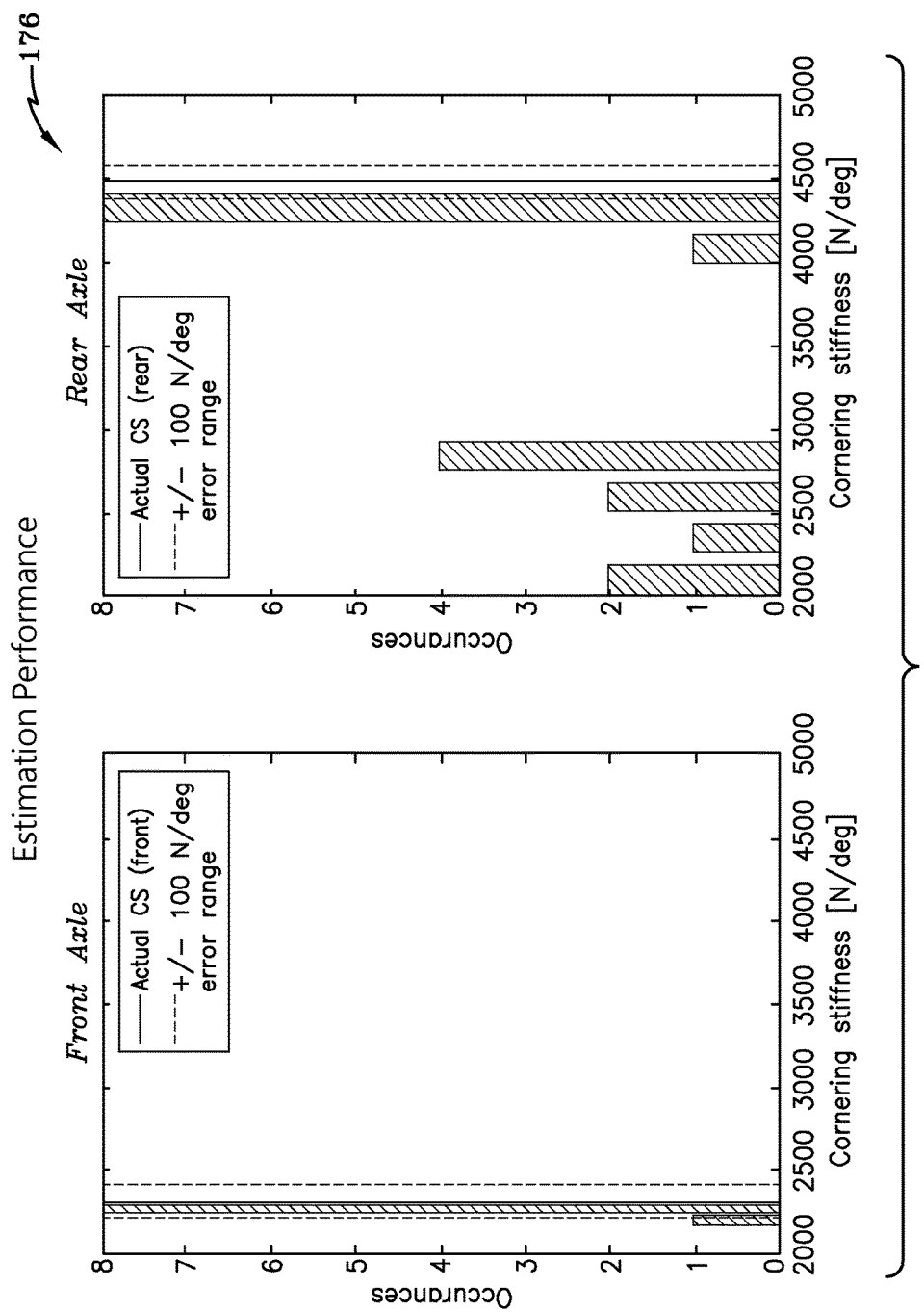
FIG. 18B is a graph of estimation performances for front and rear axles for the condition of FIG. 18A.

In FIG. 17B, estimation performance 172 is shown graphically for front and rear axles. Occurrences vs. cornering stiffness is graphed for both axles for actual cornering stiffness and for a +/−100 N/deg error range. Maximum likelihood estimates were found to be within the error band. In FIG. 18A the lateral force vs. slip angle graphs 174 for front and rear axles is shown for a front tire-deteriorated condition and rear tire new condition. the peak grip values shown. Estimation performance shown in FIG. 18B at 176 and the graphs for the test again confirm that maximum likelihood estimates are within the error band.

Figure 19B:
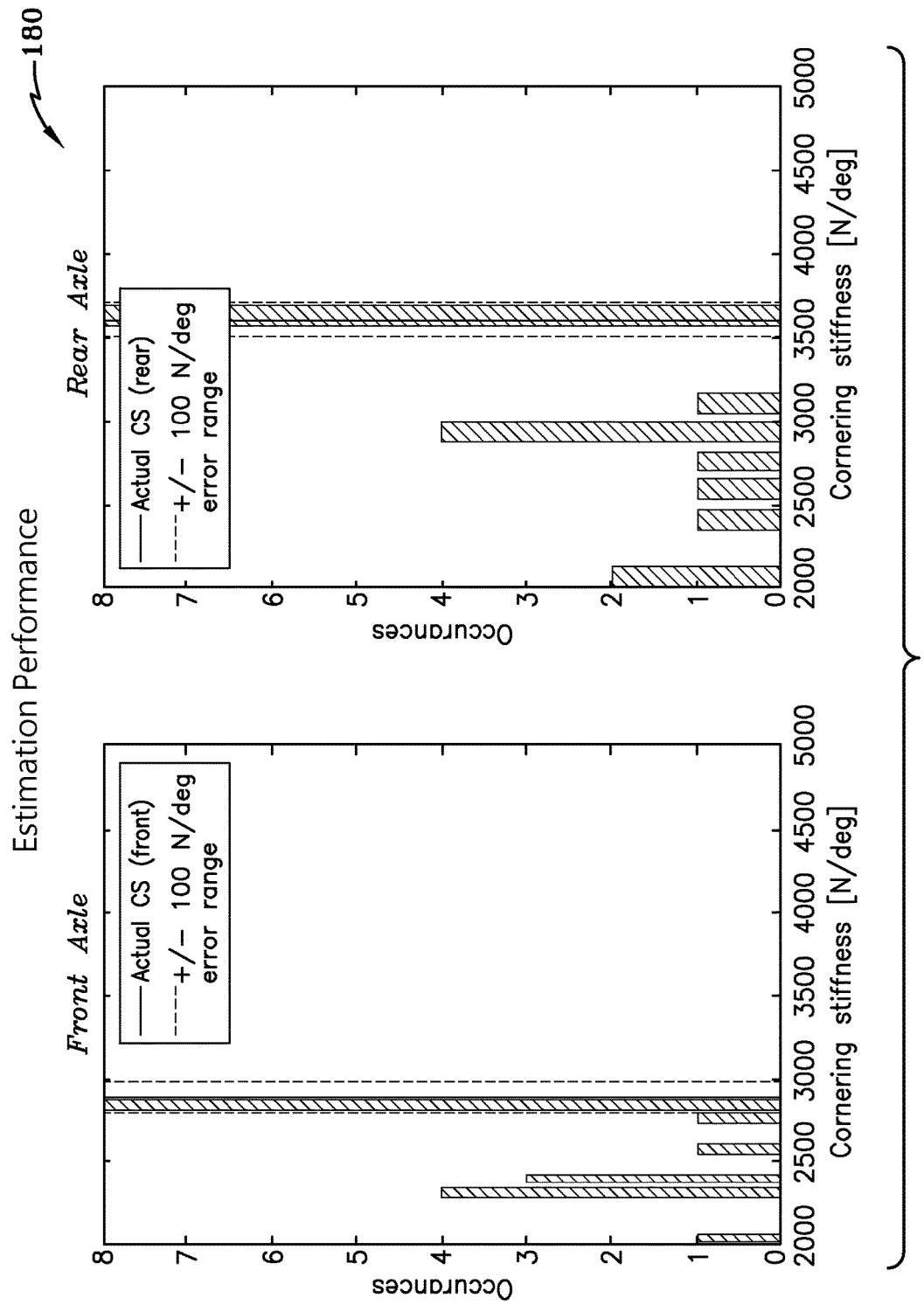
FIG. 19B are graphs of Estimation Performance for the Front and Rear Axles, plotting occurrences against cornering stiffness.

With rear tires in a deteriorated condition and front tires new, tests were again run. FIG. 19A graphs 178 show estimation performance test results. The peak grip and cornering stiffness of front and rear tires is as indicated by graph 178. The graph 178 shows lateral force to slip angle results for both front and rear axles. In FIG. 19B, actual cornering stiffness of front and rear axles is shown by graphs 180 to lie with an error range indicated. Occurrences to cornering stiffness results show a maximum likelihood estimates are within the error band.

Figure 20A:
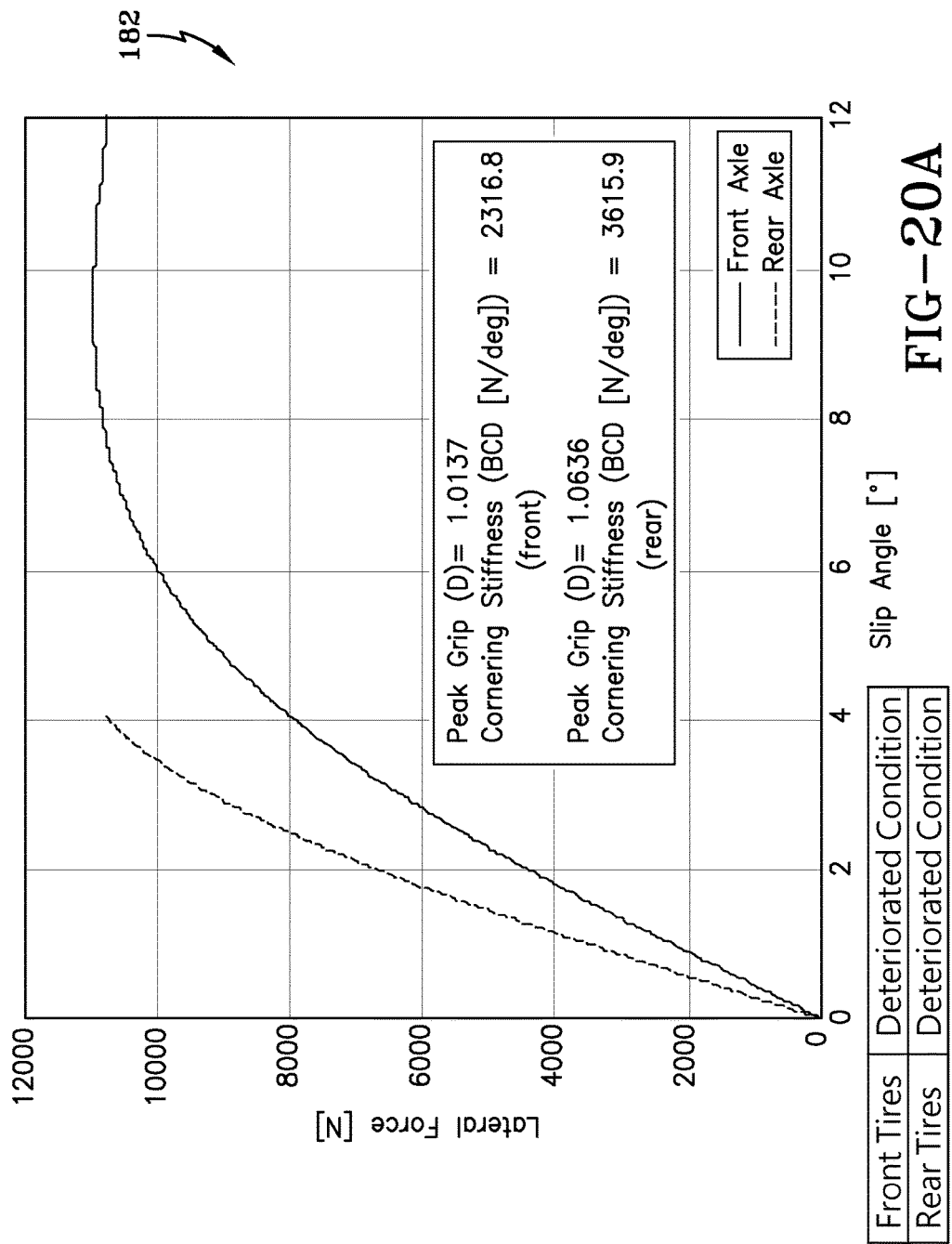
FIG. 20A is a graph for the condition Front Tires Deteriorated and Rear Tires Deteriorated, plotting lateral force against slip angle.
Figure 20B:
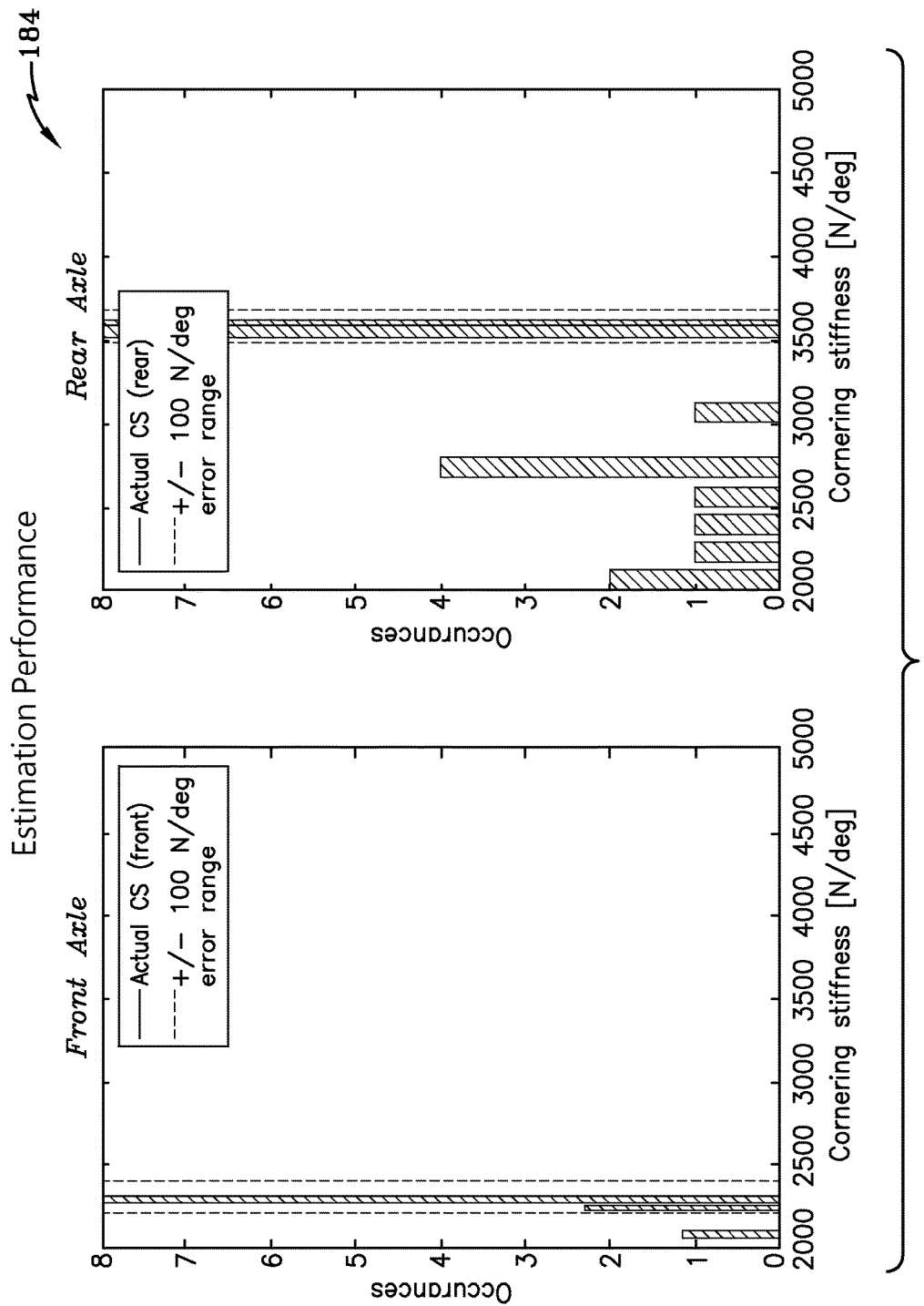
FIG. 20B are graphs of Estimation Performance using the condition of FIG. 20A for the Front and Rear Axles, plotting occurrences against cornering stiffness.

Finally, the test results for both front and rear tires in a deteriorated condition are shown by graphs 182, 184 of FIGS. 20A and 20B. The peak grip and cornering stiffness of the worn tires are indicated in FIG. 20A, and the estimation performance of actual cornering stiffness and error range in FIG. 20B. The FIG. 20B graph show maximum likelihood estimates are within the error band for the worn front and rear tire condition.

Figure 21:
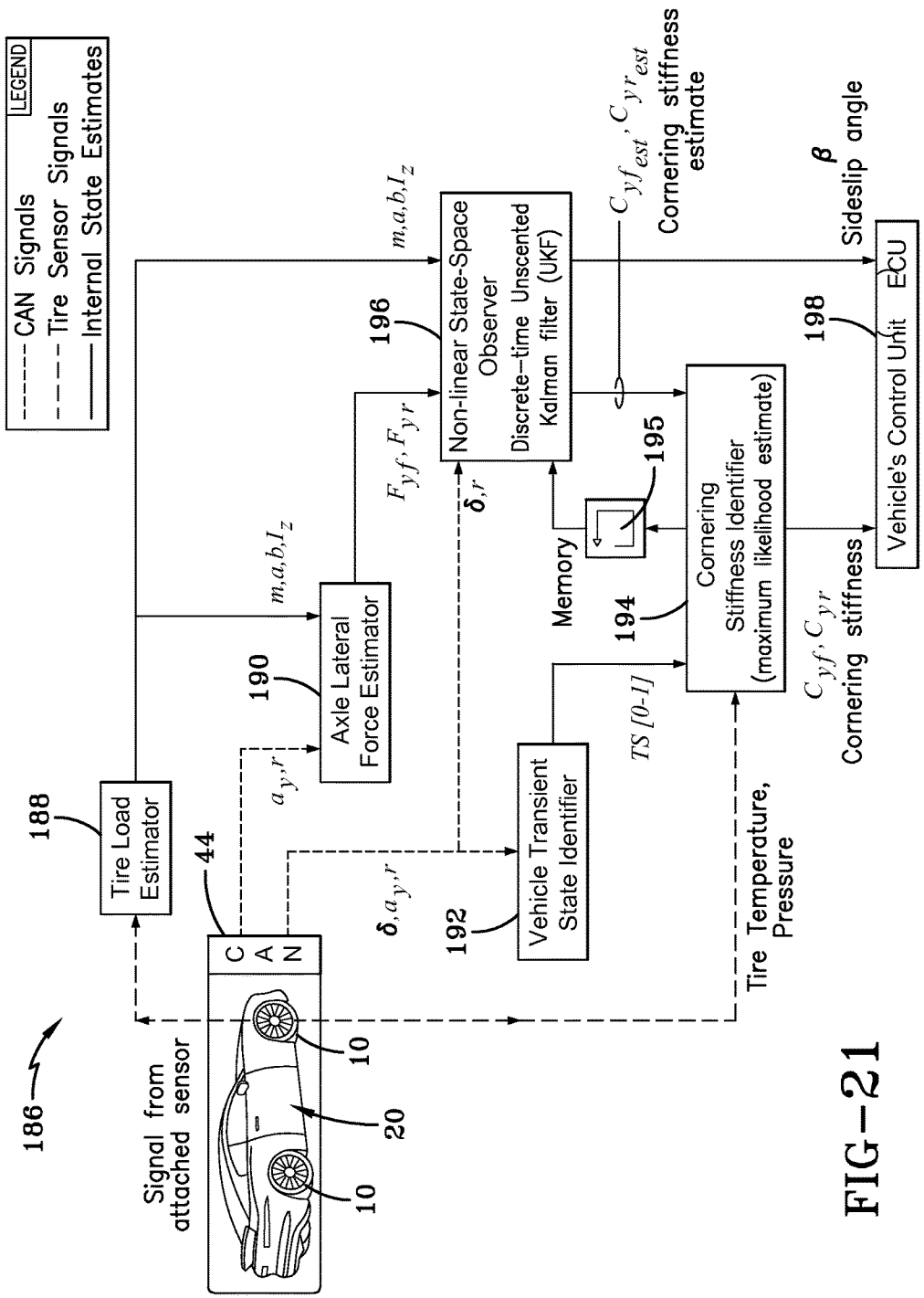
FIG. 21 is a Data Flow Diagram for the subject system and method.

FIG. 21 represents a dataflow diagram 186 of the subject system and method that will now be discussed. Nomenclature is as follows:
  $\delta$: steering wheel angle
  $a_y$: lateral acceleration
  r: yaw rate
  a: CoG to front axle distance
  b: CoG to rear axle distance
  $I_z$: yaw moment of inertia
  $F_{yf}$: front axle lateral force
  $F_{yr}$: rear axle lateral force
  $C_{yf}$: front axle cornering stiffness
  $C_{yr}$: rear axle cornering stiffness
  $\beta$ sideslip angle
  TS: transient state index Signal(s) from sensor(s) attached to the vehicle 20 are available from the CAN Bus 44 and provide $a_y$, r to an axle lateral force estimator 190, and measured parameters $\delta$, $a_y$, r to vehicle transient state identifier 192. The vehicle transient state identifier 192, as discussed above in reference to FIGS. 16A through C, produce a signal "0" indicative of the vehicle undergoing a transient state maneuver and a "1"

indicating that the vehicle maneuver is non-transient. The subject methodology uses the "1" and "0" to identify and separate transient state (accurate) from non-transient (inaccurate) cornering stiffness estimations.

The tires 10 (See FIGS. 1, 7) supporting the vehicle 20 are "intelligent" tires, equipped with a tire-mounted sensor module (TPMS) that provides tire temperature, pressure sensors to measure temperature and pressure within the tire 10, and tire identification (Tire ID) with which to identify the particular tire-specific construction of tire 10. The pressure and temperature measurements and tire ID are transmitted wirelessly from the module to a data processor conducting the cornering stiffness 194 evaluation and the tire load estimator 188. The vehicle-based sensors and intelligent tire-based pressure, temperature sensors and tire ID storage module are of a type commercially available. The vehicle-based sensors are mounted to the vehicle in conventional manner and the tire-based sensor module may be attached to the tire inner liner by appropriate known methods such as by adhesion. The tire-based sensors include transmitter capability for transmitting the measured tire parameters to a device such as a computer for data processing in accordance with the description provided herein.

The vehicle transient state identifier generator at 192 output is either a "1" or a "0" and is provided to the cornering stiffness identifier (maximum likelihood estimate) 194 along with the intelligent tire sensor outputs of temperature, pressure measurements and tire ID. The cornering stiffness identifier 194 has stored in a memory 195 accessible date from which to determine cornering stiffness $C_{yf}$ and $C_{yr}$ for front and rear axles based on the tire temperature, pressure, and tire ID tire-based data. Such data is used in consulting the memory 105 for a maximum likelihood estimate determinations. It will be appreciated that the estimations of cornering stiffness relied upon by the system and method are only those that are estimated for transient state vehicle maneuvers. Those estimates relating to non-transient state estimations are ignored. The vehicle transient state identifier "1" and "0" determination controls which estimations are from transient maneuvers and are, accordingly, accurate state outputs. The cornering stiffness identified values from identifier 194 are then used as inputs into the vehicle' electronic control unit (ECU) 198 for assisting in vehicle system control.

Cornering stiffness identifier 194 makes its cornering stiffness determination for a maximum likelihood estimation by analyzing the state identification made by the vehicle transient state identifier 192. Additional inputs of measured tire temperature and pressure and the tire ID facilitate the determination of cornering stiffness by the cornering stiffness identifier 194 from electronically consulting the tire-specific database stored within memory 195. The UKF observer 196 is preferably in the form on a discrete-time unscented Kalman filter (UKF) discussed previously. The intelligent tires 10 thus provide tire temperature and pressure data to the identifier 194 along with tire ID from which tire construction type in memory 195 may be identified.

In addition, each tire has one or more sensors used in the determination of an estimated tire load. A tire load estimator 188 receives sensor signals from tire-based sensors and determines an estimated tire load that is input into the axle lateral force estimator 190 with CAN Bus sensor signals $a_y$, r. One suitable system and method for estimating tire load from tire-based sensors is disclosed and shown in U.S. Pat. No. 8,661,885 entitled TIRE SIDEWALL LOAD ESTIMATION SYSTEM AND METHOD incorporated herein above in its entirety by reference). As described therein, a strain sensor is mounted to each tire sidewall. Signals from the strain sensors are analyzed to estimate a dynamic tire load. Use of such a system may be used to yield internal state estimates for m, a, b, $I_z$ for use as inputs into the axle lateral force estimator 190 and the observer 196 as seen from FIG. 21. The inertial state estimates are updated in real time. The axle lateral force estimator 190 derives force state estimations as described previously for axle lateral force $F_{yf}$, $F_{yr}$ which input into the Observer 196.

The Observer 196 generates cornering stiffness estimates $C_{yfest}$ and $C_{yrest}$. The $C_{yfest}$ and $C_{yrest}$ estimates are used by the cornering stiffness identifier 194 to determine the maximum likelihood estimate described previously. The tire sensor signals provide the tire pressure, temperature and tire ID data indicated. Additionally, CAN Bus signals identified are sourced from vehicle-based sensors. Together, the tire-based data from each intelligent tire 10 supporting the vehicle and vehicle-based CAN Bus sensor data is used to generate the internal state estimates shown in solid line.

From the foregoing, it will be understood that the subject system and method utilizes a model-based algorithm to estimate the vehicle sideslip angle and tire cornering stiffness. The algorithm applies the discrete-time unscented Kalman filter (UKF) for state estimation. The underlying discrete-time non-linear state-space model is based on a two-wheel lateral vehicle dynamics model. The vertical force Fz is measured using a tire-sensor based load estimate from sensors attached to intelligent tires. Knowledge of Fz enables estimation of mass (m), long CoG position (a, b) and Yaw moment of inertia (Iz), i.e. all the inertial parameters needed for the two-wheel lateral vehicle dynamics model. Stated alternatively, tire-based sensor derived Fz provides the information used to determine all of the inertial parameters need for the two-wheel lateral vehicle dynamics model that provides the basis for the algorithm for state estimation using the UKF.

The cornering stiffness estimates are made during the transient state of the vehicle and the subject system 186 statistically extracts the cornering stiffness estimate with the highest confidence measure. The cornering stiffness estimates are input into the vehicle's control unit 198 with the sideslip angle β for vehicle control systems such as steering, suspension and/or braking. The sideslip angle β is determined from the non-linear state-space observer 196 using a discrete-time unscented Kalman filter (UKF). It will be noted that the tire-based sensors are used in the tire load estimator and as input into the cornering stiffness identifier 194. Vehicle-mounted sensors provided via the CAN Bus measure the lateral acceleration $a_y$, yaw rate r and steering wheel angle δ. Such measurements are used in the axle lateral force estimator 190 and the vehicle transient state identifier 192. The UKF observer 196 receives the axle lateral force and can be used to update the vehicle and tire model parameters in real time and consequently be used to estimate the tire-road friction coefficient. Application of the subject system and method is useful in a vehicle's ESC/ESP stability control systems that depend on vehicle/tire parameters to obtain the controller targets (e.g. desired yaw behavior). The results of use of the system can be used for updating the controller reference model parameters to improve the controller efficiency. The reference model is used to generate the controller targets. Real-time updates of the reference model will ensure that the controller targets are updated appropriately with changes in the tire characteristics. For example, changes in the tire cornering stiffness due to temperature effects, tread wear effects, tire change, etc.

reflected in cornering stiffness and vehicle sideslip angle estimates by the system and method.

It will be appreciated that the vehicle state estimation system and method analyzes transient maneuver states throughout operational maneuvers of the vehicle and provides a system approach from detecting transient maneuver states from non-transient maneuver states. The tire-based sensors may be commonly assembled into a single module or mounted separately. The tire-based sensors (mounted to the tire) generate tire-based sensor data and the vehicle-based sensors (mounted to the vehicle and available through the CAN Bus) generate vehicle-based sensor data. The observer model 196 is configured to make cornering stiffness estimates from the tire-based sensor data and the vehicle-based sensor data throughout the operational maneuvers of the vehicle. The cornering stiffness identifier 194 extracts the transient-state cornering stiffness estimates made by the observer model as identified by the vehicle transient state identifier 192 throughout the operational maneuvers of the vehicle.

The cornering stiffness identifier 194 identifies an optimal transient-state cornering stiffness estimate, defined herein as that transient-state cornering stiffness estimate having a substantially highest confidence measure.

The tire-based sensor data includes a pressure measurement of tire inflation pressure and a temperature measurement of tire temperature and the vehicle-based sensor data includes vehicle lateral acceleration rate, yaw rate and steering wheel angle. The tire load estimator 186 estimates a vertical force on the vehicle tires from the tire-based sensor data. From that vertical force estimate, real time update of vehicle inertial parameters used by the observer 196 are made. As used herein, an "inertial parameter generator" is used to refer to the estimation approach explained in reference to FIG. 8 by which vehicle mass, center of gravity and yaw moment are derived from tire load information (vertical force). The inertial parameters used in a two-wheel lateral vehicle dynamics model (See FIG. 8) are thereby updated in real time as the vehicle progresses throughout operational maneuvers. The system further utilizes an axle force estimator 42 (SMC observer as seen in FIG. 4) generating force estimates on the axle into the axle cornering stiffness estimator 50 (recursive least squares with forgetting factor) to estimate from the vehicle inertial parameters and the vehicle-based sensor data an axle lateral force (cornering stiffness) estimation 52 for use by the observer model.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A vehicle state estimation system comprising:
a vehicle supported by at least one tire, the vehicle operating in transient maneuver states or non-transient maneuver states throughout operational maneuvers of the vehicle;
at least one tire-based sensor being discrete from any vehicle-based sensors, the at least one tire-based sensor being mounted to the at least one tire and operative to generate tire-based sensor data, the tire-based sensor data including at least a measurement of tire inflation pressure and a measurement of tire temperature;
at least one vehicle-based sensor being discrete from any tire-based sensors, the at least one vehicle-based sensor being mounted to the vehicle separate from the vehicle tires and operative to generate vehicle-based sensor data, the vehicle-based sensor data including at least a lateral acceleration, a yaw rate and a steering wheel angle;
an observer model operative to make cornering stiffness estimates from the tire-based sensor data and the vehicle-based sensor data throughout the operational maneuvers of the vehicle; and
a cornering stiffness identifier operative to extract and output transient-state cornering stiffness estimates from the observer model cornering stiffness estimates throughout the operational maneuvers of the vehicle.

2. The vehicle state estimation system of claim 1, wherein the cornering stiffness identifier is operative to extract from the transient-state cornering stiffness estimates an optimal transient-state cornering stiffness estimate having a substantially highest confidence measure.

3. The vehicle state estimation system of claim 2, further comprising a tire load estimator for operatively estimating a vertical force on the at least one tire from the tire-based sensor data.

4. The vehicle state estimation system of claim 3, further comprising an inertial parameter generator operative to output to the observer model a substantially real-time update of vehicle inertial parameters derived from the vertical force estimation.

5. The vehicle state estimation system of claim 4, wherein the at least one tire is mounted to an axle, and the vehicle state estimation system further comprising an axle force estimator operative to estimate from the vehicle inertial parameters and the vehicle-based sensor data an axle lateral force estimation on the axle and output the axle lateral force estimation to the observer model.

6. The vehicle state estimation system of claim 2, wherein the observer model comprises a discrete-time unscented Kalman filter.

7. The vehicle state estimation system of claim 2, further comprising a vehicle sideslip angle estimator operative to generate a sideslip angle estimation.

8. The vehicle state estimation system of claim 2, further comprising a vehicle control unit receiving as an input the optimal transient-state cornering stiffness estimate from the cornering stiffness identifier.

9. The vehicle state estimation system of claim 8, wherein the vehicle control unit receives as a further input a sideslip angle estimation made by the sideslip angle estimator.

10. A vehicle state estimation method comprising:
supporting a vehicle by at least one tire, the vehicle operating in transient maneuver states or non-transient maneuver states throughout operational maneuvers of the vehicle;
mounting at least one tire-based sensor to the at least one tire, the at least one tire-based sensor being discrete from any vehicle-based sensors and being operative to generate tire-based sensor data, the tire-based sensor data including at least a measurement of tire inflation pressure and a measurement of tire temperature;
mounting at least one vehicle-based sensor to the vehicle separate from the vehicle tires, the at least one vehicle-based sensor being discrete from any tire-based sensors and being operative to generate vehicle-based sensor data, the vehicle-based sensor data including at least a lateral acceleration, a yaw rate and a steering wheel angle;

generating cornering stiffness estimates from an observer model based upon the tire-based sensor data and the vehicle-based sensor data throughout the operational maneuvers of the vehicle; and extracting a plurality of extracted output transient-state cornering stiffness estimates from the observer model through a cornering stiffness identifier throughout the operational maneuvers of the vehicle.

11. The vehicle state estimation method of claim 10, further comprising extracting from the extracted transient-state cornering stiffness estimates an optimal transient-state cornering stiffness estimate having a substantially highest confidence measure.

12. The vehicle state estimation method of claim 11, further comprising:

estimating a vertical force on the at least one tire from the tire-based sensor data;

generating a plurality of vehicle inertial parameters from the vertical force estimation;

updating the vehicle inertial parameters in substantially real-time throughout the vehicle operational maneuvers;

inputting the updated vehicle inertial parameters to the observer model.

13. The vehicle state estimation system of claim 11, further comprising using the optimal transient-state cornering stiffness estimate in a vehicle control unit.

14. The vehicle state estimation system of claim 13, further comprising:

generating a sideslip angle estimation with a sideslip angle estimator model; and using the sideslip angle estimation by the vehicle control unit.

* * * * *